(12) United States Patent
Kaneko et al.

(10) Patent No.: US 9,625,586 B2
(45) Date of Patent: Apr. 18, 2017

(54) SCINTILLATOR PLATE, RADIATION MEASURING APPARATUS, RADIATION IMAGING APPARATUS, AND SCINTILLATOR PLATE MANUFACTURING METHOD

(75) Inventors: Junichi Kaneko, Sapporo (JP); Mikio Higuchi, Sapporo (JP); Takehiro Shimaoka, Sapporo (JP); Youichi Tsubota, Sapporo (JP); Kenji Izaki, Ibaraki (JP)

(73) Assignee: JAPAN ATOMIC ENERGY AGENCY, Tokai-Mura, Naka-Gun, Ibaraki (JP)

( * ) Notice: Subject to any disclaimer, the term of this patent is extended or adjusted under 35 U.S.C. 154(b) by 89 days.

(21) Appl. No.: 14/008,790

(22) PCT Filed: Mar. 30, 2012

(86) PCT No.: PCT/JP2012/058621
§ 371 (c)(1),
(2), (4) Date: Sep. 30, 2013

(87) PCT Pub. No.: WO2012/133796
PCT Pub. Date: Oct. 4, 2012

(65) Prior Publication Data
US 2014/0014846 A1 Jan. 16, 2014

(30) Foreign Application Priority Data
Mar. 31, 2011 (JP) .................. 2011-079426

(51) Int. Cl.
*G01T 1/20* (2006.01)
*G01T 3/06* (2006.01)

(52) U.S. Cl.
CPC . *G01T 1/20* (2013.01); *G01T 3/06* (2013.01)

(58) Field of Classification Search
CPC ..... G01T 1/1642; G01T 1/208; G01T 1/1647; G01T 1/17; G01T 1/2985
(Continued)

(56) References Cited

U.S. PATENT DOCUMENTS 4,687,636 A * 8/1987 Hart .............................. 422/408
5,912,939 A * 6/1999 Hirsch ................... H05G 2/001
378/190

(Continued)

FOREIGN PATENT DOCUMENTS

JP 2006-199727 A 8/2006
JP 2006/258755 A 9/2006
(Continued)

*Primary Examiner* — David Porta
*Assistant Examiner* — Mamadou Faye
(74) *Attorney, Agent, or Firm* — Muncy, Geissler, Olds & Lowe, P.C.

(57) ABSTRACT

[Problem] To provide a scintillator plate capable of improving the accuracy of radiation detection, and expanding the surface area for practical use while suppressing manufacturing costs, and also provide a radiation measuring apparatus, a radiation imaging apparatus, and a scintillator plate manufacturing method.
[Solution] A scintillator plate (1) includes a scintillator (2) that generates scintillation light when excited by incident radiation. The scintillator plate (1) includes a scintillator layer (22) covered with scintillator powder (21) having an average particle diameter equal to or greater than the range of the radiation within the scintillator (2) when the radiation to be measured is either alpha rays, electron beams, or ion beams.

21 Claims, 18 Drawing Sheets

(58) Field of Classification Search
USPC .......................................................... 250/369
See application file for complete search history.

(56) References Cited

U.S. PATENT DOCUMENTS

| | | | |
|---|---|---|---|
| 7,375,336 | B2 | 5/2008 | Hasegawa et al. |
| 2001/0013510 | A1* | 8/2001 | Wiener-Avnear et al. ........................ 219/121.69 |
| 2003/0006373 | A1* | 1/2003 | Koguchi et al. .............. 250/311 |
| 2005/0017189 | A1* | 1/2005 | Homma et al. .......... 250/370.11 |
| 2005/0189534 | A1* | 9/2005 | Guyot-Sionnest .. H01L 31/0352 257/21 |
| 2006/0022142 | A1* | 2/2006 | Edward Robinson .............. G01T 1/2002 250/370.11 |
| 2006/0060823 | A1* | 3/2006 | Cooke et al. ............ 252/301.36 |
| 2007/0237668 | A1* | 10/2007 | Martins Loureiro .. B82Y 30/00 419/48 |
| 2010/0108897 | A1* | 5/2010 | Iwamoto ....................... 250/368 |
| 2010/0219350 | A1 | 9/2010 | Kobashi et al. |
| 2011/0035161 | A1* | 2/2011 | McFadden et al. ............ 702/28 |
| 2012/0085972 | A1* | 4/2012 | LaCourse et al. ..... 252/301.4 F |
| 2012/0145962 | A1* | 6/2012 | Fukuta ............... C09K 11/7774 252/301.4 R |

FOREIGN PATENT DOCUMENTS

| | | |
|---|---|---|
| JP | 2007-145902 A | 6/2007 |
| WO | 2007/099973 | 9/2007 |
| WO | 2008/132849 | 11/2008 |

* cited by examiner

CADMIUM PLATE

SCINTILLATOR PLATE, RADIATION MEASURING APPARATUS, RADIATION IMAGING APPARATUS, AND SCINTILLATOR PLATE MANUFACTURING METHOD

TECHNICAL FIELD

The present invention relates to a scintillator plate that is excited by a radiation to emit scintillation light, a radiation measuring apparatus, a radiation imaging apparatus, and a scintillator plate manufacturing method.

BACKGROUND ART

Si semiconductor detectors with extremely high energy resolution are widely used as a device for measuring α rays in a dust monitor for monitoring plutonium contamination. However, the Si semiconductor detectors have a problem that the electrodes are susceptible to corrosion by moisture in the air. In addition, the Si semiconductor detectors have a problem that the detectors tend to pick up electric noise and provide an erroneous output.

In order to solve the problems of the Si semiconductor detectors described above, Izaki et al., the inventors, have proposed a ZnS(Ag) scintillation detector serving as an α rays measuring apparatus that is filled with a plurality of layers of ZnS(Ag) scintillator particles having a particle diameter of 5 μm having a thickness of 10 mg/cm$^2$, in Japanese Patent No. 4061367 (Patent Literature 1).

There is also a scintillation detector used in a positron emission tomography (PET) apparatus or the like for a nuclear medicine image diagnostic method.

For example, in Japanese Patent Laid-Open No. 2006-199727, there is proposed a radiation detector that uses a scintillator made of a single crystal cerium-activated lanthanoid silicate as an X-rays detector used in a positron emission tomography apparatus (Patent Literature 2).

CITATION LIST

Patent Literature

Patent Literature 1: Japanese Patent No. 4061367
Patent Literature 2: Japanese patent Laid-Open No. 2006-199727

SUMMARY OF INVENTION

Technical Problem

However, the invention described in Patent Literature 1 has a problem that scintillation light emitted as a result of excitation by α rays is repeatedly reflected or diffused by surfaces of the scintillator particles and does not adequately reach the photomultiplier tube or the like that is to receive the scintillation light. Therefore, compared with the Si semiconductor detector, the pulse height discriminating capability for α rays is low and needs to be improved. That is, the invention described in Patent Literature 1 can detect α rays but does not have an energy discriminating capability enough to discriminate α rays having different amounts of energy emitted by a plurality of nuclides, such as plutonium and a radon daughter nuclide.

In the case of a radiation detector using a scintillator single crystal, such as the invention described in Patent Literature 2, there is a limitation of the size of the single crystal, it is difficult, and unfeasible in terms of cost, to manufacture a thin and wide scintillator plate from a single crystal. In addition, it is difficult to reduce the thickness of the single crystal scintillator while maintaining a large area as described above, there is a problem that the scintillator is susceptible to the effect of γ rays.

The present invention has been made to solve the problems described above, and an object of the present invention is to provide a scintillator plate that has an improved radiation detection precision and can be practically increased in size while reducing the manufacturing cost, a method of manufacturing the same, and a radiation measuring apparatus and a radiation imaging apparatus using the same.

Solution to Problem

A scintillator plate according to the present invention is a scintillator plate containing a scintillator that is excited by an incident radiation to emit scintillation light, wherein in a case where a measurement target radiation is any of α rays, an electron beam and an ion beam, the scintillator plate has a scintillator layer formed by laying scintillator powders having an average particle diameter equal to or greater than a range of the radiation in the scintillator.

According to an aspect of the present invention, one or both of surfaces of the scintillator layer can be polished so that the thickness of the scintillator layer is equal to or greater than 20 μm and equal to or smaller than 100 μm.

A scintillator plate according to the present invention is a scintillator plate containing a scintillator that is excited by an incident radiation to emit scintillation light, wherein in a case where a measurement target radiation is a neutron beam, the scintillator plate has a scintillator layer formed by laying scintillator powders having an average particle diameter equal to or greater than a mean free path of the neutron beam in the scintillator.

According to an aspect of the present invention, one or both of surfaces of the scintillator layer can be polished so that the thickness of the scintillator layer is equal to or greater than 30 μm and equal to or smaller than 150 μm.

A scintillator plate according to the present invention is a scintillator plate containing a scintillator that is excited by an incident radiation to emit scintillation light, wherein in a case where a measurement target radiation is X rays, the scintillator plate has a scintillator layer formed by laying scintillator powders having an average particle diameter greater than 300 μm, and one or both of surfaces of the scintillator layer is polished so that the thickness of the scintillator layer is equal to or greater than 300 μm and equal to or smaller than 500 μm.

According to an aspect of the present invention, the scintillator layer preferably has a single layer structure formed by laying the scintillator powders in a single layer.

Furthermore, according to an aspect of the present invention, the scintillator layer can be formed by embedding scintillator powders having an average particle diameter equal to or greater than the average particle diameter of the scintillator powders determined by the kind of the radiation in a gap between the scintillator powders adjacent to each other laid in a single layer, and one or both of surfaces of the scintillator layer can be polished.

Furthermore, according to an aspect of the present invention, the scintillator can be selected from among a GPS scintillator, a ZnS(Ag) scintillator, a YAP scintillator and a CsI scintillator.

A radiation measuring apparatus according to the present invention comprises: the scintillator plate; a signal converting part that converts scintillation light emitted by the scintillator plate into an electric signal; a radiation discriminating part that discriminates a measurement target radiation and another radiation from each other based on an upper limit value and a lower limit value of the intensity of the electric signal that are set depending on the kind of the measurement target radiation; a counting part that counts discriminated electric signals of the measurement target radiation; and a radiation determining part that determines the presence or absence of the measurement target radiation by comparison between a count from the counting part and a predetermined threshold.

A radiation imaging apparatus according to the present invention comprises the scintillator plate.

A scintillator plate manufacturing method according to the present invention comprises: a scintillator layer forming step of forming a scintillator layer by laying scintillator powders having a predetermined average particle diameter on a surface of an adhesive material and bonding the scintillator powders; and a scintillator layer polishing step of polishing one or both of surfaces of the scintillator layer until the scintillator layer has a predetermined thickness.

According to an aspect of the present invention, in the scintillator layer forming step, a sub-step of removing scintillator powders that are not bonded to the surface of the adhesive material and laying the scintillator powders having the predetermined average particle diameter in gaps between the scintillator powders bonded to the surface of the adhesive material can be repeated at least once.

Furthermore, according to an aspect of the present invention, before the scintillator layer forming step, the method can further comprise a fine particle removing step of removing fine particles from the scintillator powders to be used by immersing the scintillator powders with the fine particles adhering thereto in a liquid, agitating the liquid and then removing a supernatant containing the fine particles after a lapse of a predetermined time.

Advantageous Effect of Invention

According to the present invention, the radiation detection precision of the scintillator plate can be improved, and the size of the scintillator plate can be practically increased while reducing the manufacturing cost.

BRIEF DESCRIPTION OF THE DRAWINGS

FIG. 2(*b*) is a cross-sectional view taken along the line A-A in FIG. 2(*a*).

FIG. 3(*b*) is a cross-sectional view taken along the line A-A in FIG. 3(*a*).

DESCRIPTION OF EMBODIMENTS

In the following, a scintillator plate, a radiation measuring apparatus, a radiation imaging apparatus and a scintillator plate manufacturing method according to embodiments of the present invention will be described.

Figure 1:
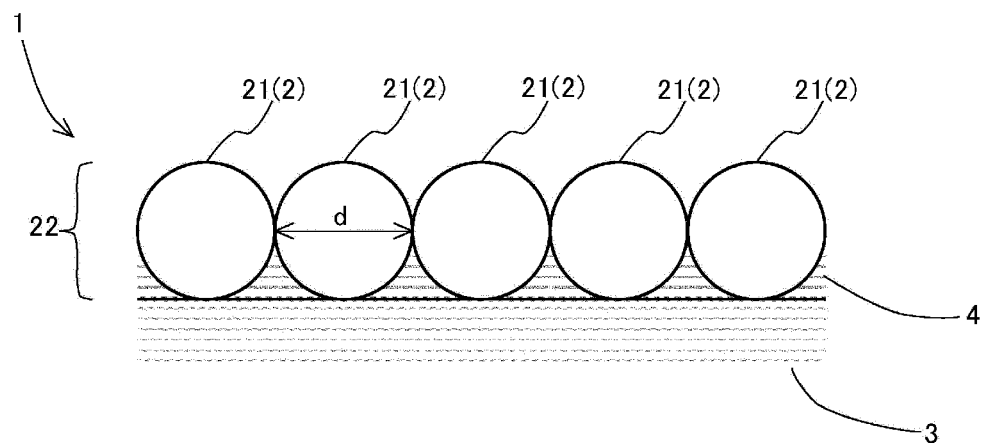
FIG. 1 is an enlarged cross-sectional view of a scintillator plate according to an embodiment of the present invention.

A scintillator plate according to an embodiment will be first described. FIG. 1 is an enlarged cross-sectional view of a scintillator plate 1 according to this embodiment. The scintillator plate 1 according to this embodiment comprises scintillator powders 21 of a scintillator 2 that is excited by a radiation, a scintillator layer 22 formed by laying the scintillator powders 21, and a substrate 3 to which the scintillator layer 22 is fixed. According to this embodiment, a suitable adhesive 4 is used to fix the scintillator powders 21 to the substrate 3 to form the scintillator layer 22.

The scintillator 2 is a material that emits scintillation light when it is excited by an incident radiation. For example, the scintillator 2 may be a $Gd_2Si_2O_7$ scintillator (GPS scintillator), a ZnS(Ag) scintillator, a YAP scintillator or a CsI scintillator.

The GPS scintillator is made of $Gd_2Si_2O_7$ and may further contain Ce added thereto as an active material. In this embodiment, the GPS scintillator is manufactured by crystallization of powders of $Gd_2SiO_3$, $CeO_2$ and $SiO_2$ in a top seeded solution growth (TSSG) method. The method of manufacturing the GPS scintillator is not limited to the TSSG method and can be appropriately selected from among a solid phase reaction method, a sol-gel method and the like.

According to this embodiment, the scintillator 2 is used in a powder form. The average particle diameter d of the scintillator powders 21 is selected to be a predetermined value depending on the kind of the scintillator 2 and the kind of the measurement target radiation, as described below.

For example, in the case where the measurement target radiation is a charged particle having a charge, which is a directly ionizing radiation that is incident on the scintillator 2 and causes the scintillator 2 to emit scintillation light, the average particle diameter d of the scintillator powders 21 is preferably equal to or greater than the range of the particle in the scintillator 2, in order to increase the efficiency of emission of the scintillation light. The directly ionizing radiation is α rays, an electron beam, or an ion beam, for example. According to the concept of the present invention, electron beams include β rays. The term "range" herein refers to the distance for which a radiation having a charge capable of causing direct ionization, such as α rays, incident on a material can travel in the material. According to this embodiment, the range depends on the combination of the kind of the scintillator 2 and the kind of the radiation. Thus, in the case where the measurement target is the directly ionizing radiation, the average particle diameter d of the scintillator powders 21 is preferably equal to or greater than the range to increase the probability of emission of the scintillation light. In the case where the measurement target radiation is an electron, the projected range, which is in the front direction, is preferably used.

On the other hand, in the case where the radiation is not the directly ionizing radiation having a charge but an indirectly ionizing radiation, which is incident on the scintillator 2 to collide or otherwise interact with an atom or atomic nucleus in the scintillator 2 to generate a charged particle, which excites the scintillator 2 to emit scintillation light, the average particle diameter d of the scintillator powders 21 is preferably equal to or greater than the mean free path of the indirectly ionizing radiation in the scintillator 2, in order to increase the efficiency of emission of the scintillation light. The indirectly ionizing radiation is a neutron beam or γ rays, for example. The term "mean free path" herein refers to the average distance for which an indirectly ionizing radiation having no charge, such as a neutron beam, incident on a material travels before interacting or otherwise reacting with the material. According to this embodiment, the means free path depends on the kind of the scintillator 2 and the kind of the radiation. Thus, in the case where the measurement target is the indirectly ionizing radiation, the average particle diameter d of the scintillator powders 21 is preferably equal to or greater than the means free path to increase the probability of emission of the scintillation light.

The method of selecting the scintillator powders 21 having a predetermined average particle diameter is not particularly limited and can be appropriately selected from among various methods, including a method that involves using a sieve and a method that takes advantage of the difference in the rate of sedimentation due to the difference in the particle diameter. As described later with regard to a fine particle removing step, fine particles can be removed from the scintillator powders 21 by immersing the selected scintillator powders 21 in a liquid, such as a phosphate solution, an alcohol or water, agitating the liquid to diffuse the scintillator powders 21 and the fine particles having adhered to the scintillator powders 21 in the liquid and then discarding the supernatant.

Figure 2A:
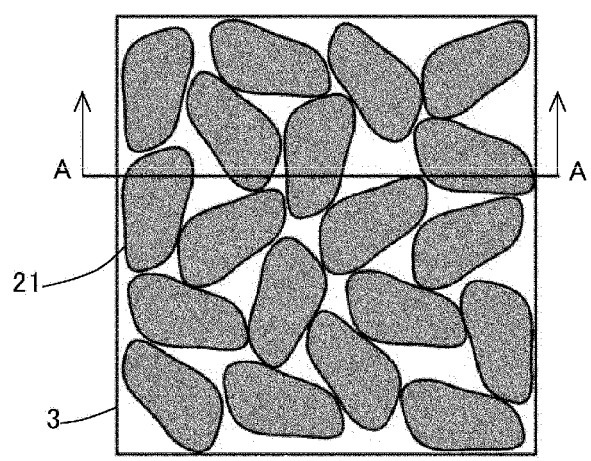
FIG. 2(*a*) is a plan view of a scintillator layer formed in a single layer according to the embodiment.
Figure 2B:
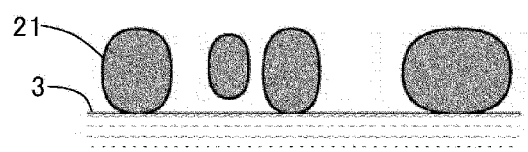

The scintillator layer 22 is formed by laying the scintillator powders 21 and fixing the scintillator powders 21 with an adhesive or the like. The scintillator layer 22 may be formed by a plurality of beds (layers) of scintillator powders 21 but has to be thinner than a predetermined maximum thickness as described later. In the case where the scintillator layer 22 is formed by a plurality of beds (layers) of scintillator powders 21, however, the emitted scintillation light can be reflected or diffused by the powders. To avoid this, the scintillator layer 22 is preferably formed by a single layer of scintillator powders as shown in FIG. 2. In the present invention, however, the single layer structure of the scintillator layer 22 does not need to be strictly construed and can include a structure in which gaps between adjacent scintillator powders 21 are filled with further scintillator powders, for example, as far as desired effects and advantages are achieved.

Figure 3A:
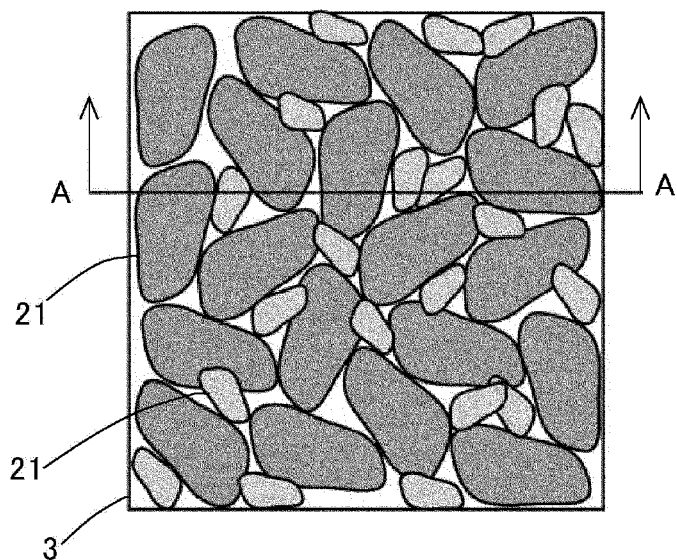
FIG. 3(*a*) is a plan view of a scintillator layer formed by laying further scintillator powders in gaps between the scintillator powders laid in a single layer according to the embodiment.
Figure 3B:
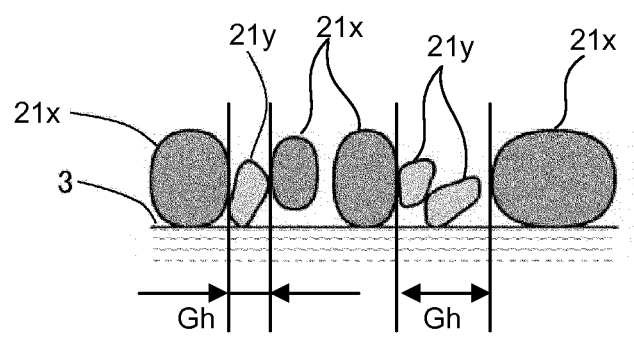
Figure 4:
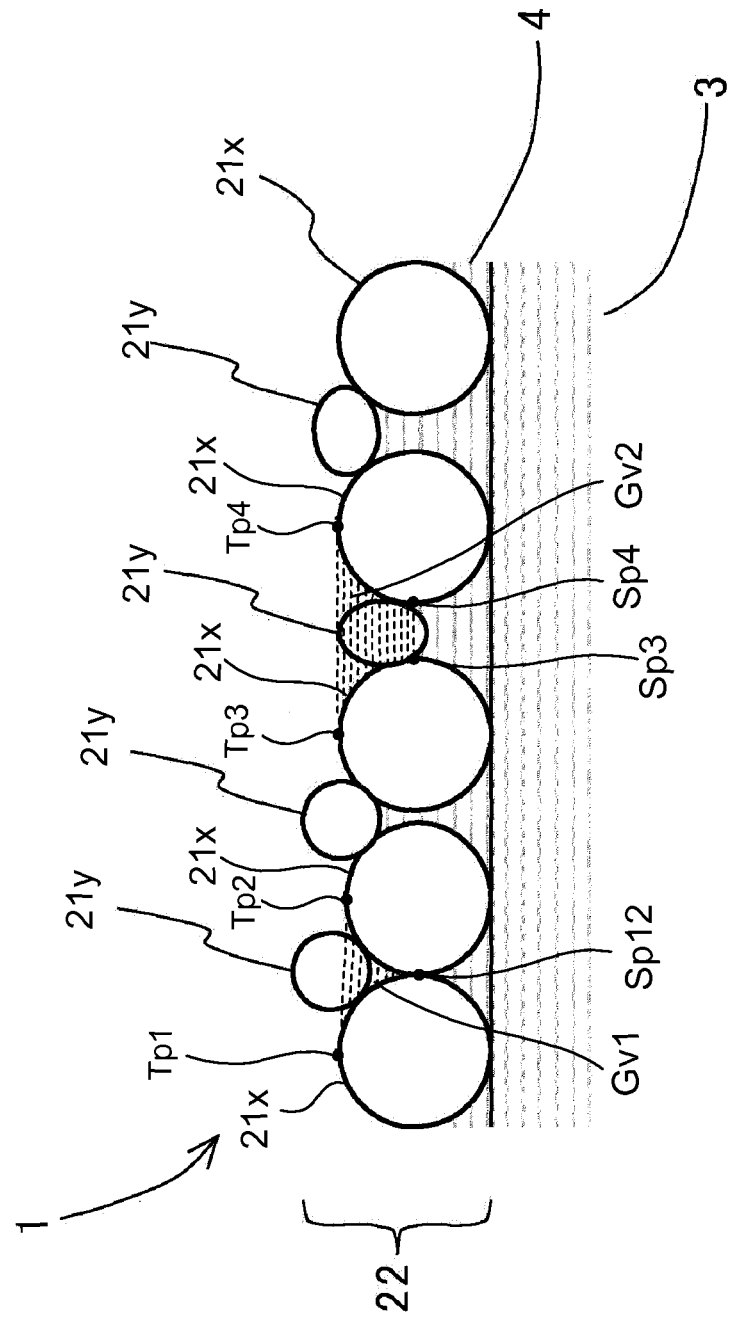
FIG. 4 is an enlarged cross-sectional view of a scintillator layer formed by filling gaps between the scintillator powders laid in a single layer with further scintillator powders having a predetermined average particle diameter.

The scintillator layer 22 preferably has a higher filling factor of the scintillator powders 21 in terms of detection precision. Thus, in laying the scintillator powders 21 having a predetermined average particle diameter d, the scintillator powders 21 are preferably compressed to some extent to reduce the gaps between the scintillator powders 21. When the gaps (Gh) are larger than the required average particle diameter of scintillator powders, which are determined by the type of radiation, as shown in FIG. 3(b), further other scintillator powders 21y are preferably embedded in the gaps (Gh) between the scintillator powders 21x laid in a single layer. The powder 21y is smaller than the powders 21x, but its average particle diameter is equal to or greater than the required average particle diameter as well as the powder 21x. The gaps are defined by empty spaces surrounded by two powders 21x. FIG. 3(b) illustrates horizontal gaps (Gh) existing between two powders 21x. FIG. 4 illustrates other gaps (Gv), which are vertical gaps, existing between two of the upper hemispheres of powders 21x. These gaps (Gh, Gv) are shown with hatching in the drawings. More specifically, in case of two powders 21x contacting, gap (Gv1) is defined by three points (Tp1, Tp2, Sp12). In a case of two powders 21x separating, gap (Gv2) is defined by four points (Tp3, Tp4, Sp3, Sp4). The points Sp3 and Sp4 are determined as points from which two powders 21x are connected with the minimum distance. In the process of filling the gaps between the scintillator powders 21x, it is preferred to fill not only the horizontal gaps (Gh) between scintillator powders 21x, bonded spaced apart from each other as shown in FIG. 3(b) but also the vertical gaps (Gv) between the upper parts of the scintillator powders 21x bonded close to each other as shown in FIG. 4.

Next, the thickness of the scintillator layer 22 will be prescribed. The scintillator layer 22 has to have such a thickness as to allow the measurement target radiation incident on the scintillator layer 22 to excite emission of scintillation light and at the same time suppress excitation of scintillation light by the other radiations than the measurement target radiation, so that the measurement target radiation and the other radiations can be discriminated from each other. In the following, a method of setting the thickness of the scintillator layer for the measurement target radiation will be described with regard to a specific example.

Figure 5:
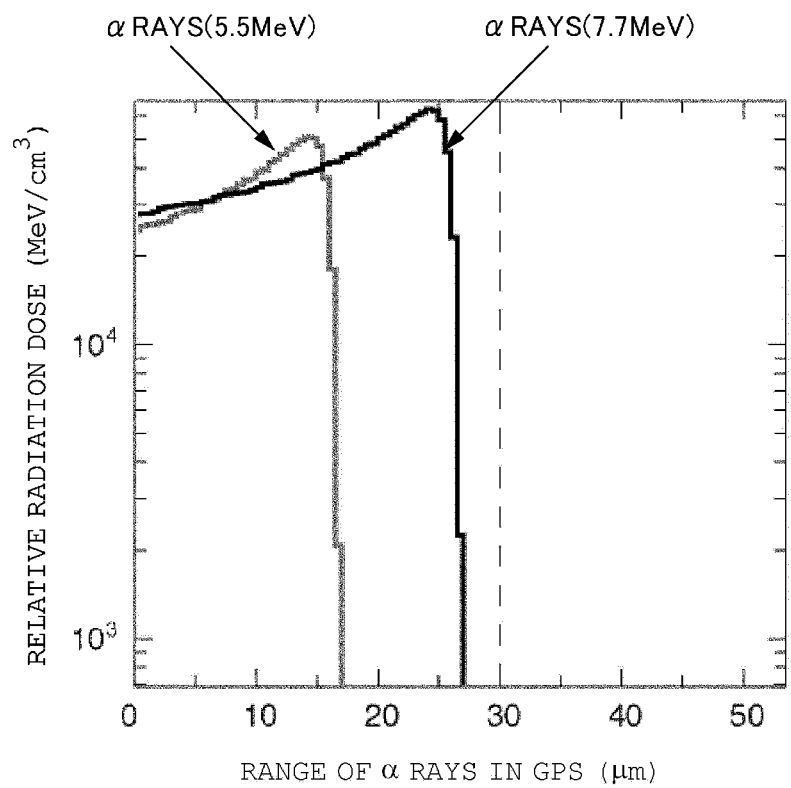
FIG. 5 is a graph showing the range of α rays in a GPS scintillator according to the embodiment.

First, a case where the measurement target radiation is α rays will be described. As shown in FIG. 5, in the case where the measurement target radiation is α rays of 5.5 MeV emitted by plutonium-239 (239Pu), and the scintillator 2 is the GPS scintillator, the range is approximately 17 μm. On the other hand, in the case where the measurement target radiation is α rays of 7.7 MeV emitted by a radon daughter nuclide, which exists in nature and emits α rays, the range is approximately 27 μm. Therefore, in the case where the measurement target radiation is α rays emitted by plutonium-238, the thickness of the scintillator powders 21 is preferably equal to or greater than 20 μm taking measurement errors into consideration.

On the other hand, there are various radiations other than the measurement target radiation, such as β rays and γ rays, in nature. For example, a radon daughter nuclide emits more β rays and γ rays than α rays. When such β rays or γ rays are incident on the scintillator 2, the scintillator 2 emits scintillation light as in the case where α rays are incident on the scintillator 2. As can be seen from the result of a example 13 described later (see FIG. 14), when the γ rays are not the measurement target radiation, there is a tendency that the energy contribution of the γ rays in the scintillator 2 increases and the range of the focused light intensities in which the scintillation light is count increases as the thickness of the scintillator 2 increases. β rays also have a similar tendency. Therefore, the scintillator 2 preferably has a small thickness that reduce the energy contribution of the radiation other than the measurement target radiation in the scintillator 2 so that the scintillation light caused by the other radiation can be discriminated from the scintillation light caused by the α rays. With the scintillator plate 1 according to the present invention, the thickness of the scintillator 2 is reduced as far as possible to transmit as much radiations other than the measurement target radiation as possible to minimize the energy contribution of the other radiations in the scintillator 2 and the scintillation light emission, thereby facilitating discrimination between the of the measurement target radiation and the other radiations.

Therefore, from the viewpoint of the range of the measurement target radiation and the discrimination between the measurement target radiation and the other radiations, in the case where the measurement target radiation is α rays emitted by plutonium, the thickness of the scintillator layer 22 is preferably equal to or greater than 20 μm and equal to or smaller than 100 μm.

Figure 6:
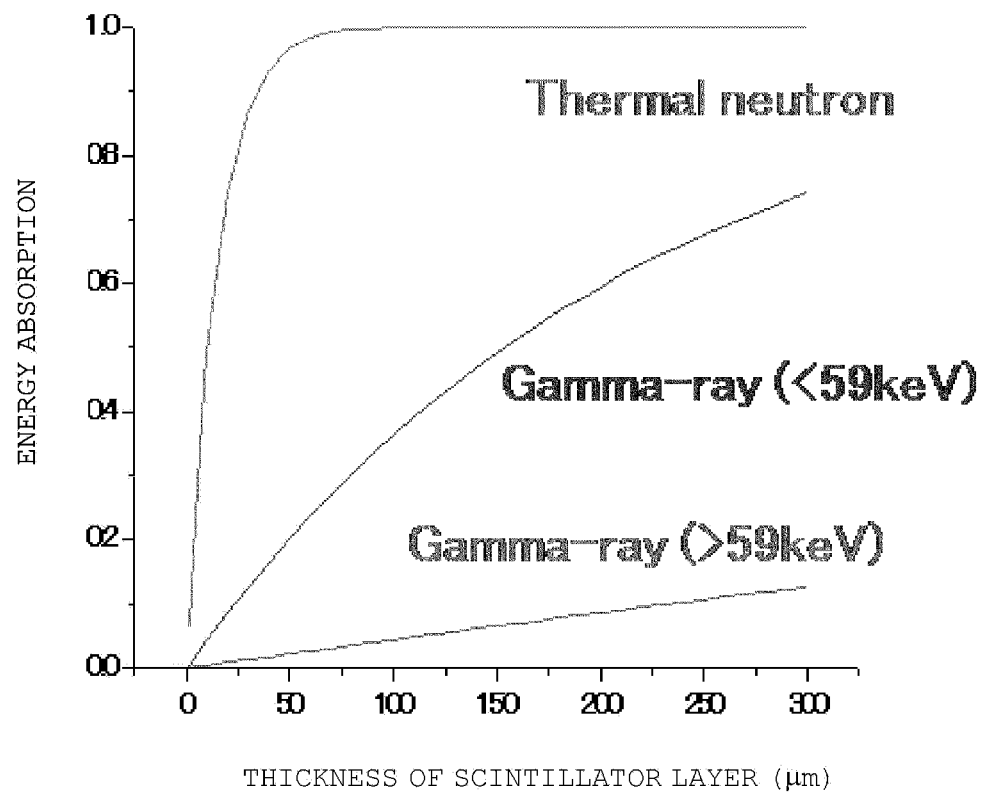
FIG. 6 is a graph showing a relationship between the thickness of the scintillator layer and the energy absorption of the GPS scintillator according to the embodiment.

Next, a case where the measurement target radiation is a neutron beam will be described. FIG. 6 is a graph showing a relationship between the thickness of the scintillator layer 22 and the energy absorption in the case of the GPS scintillator. The "energy absorption" refers to the probability that the radiation incident on the scintillator interacts or otherwise reacts with the scintillator, and the energy absorption value of 1 means that all the radiations react with the scintillator. The mean free path is defined as the thickness at which the energy absorption is $(1-1/e)$, where e denotes the Napierian logarithm. Thus, the mean free path equals to the thickness at which the energy absorption is approximately 0.63, that is, the probability that the radiation reacts with the scintillator 2 is approximately 63%. As shown in FIG. 6, the mean free path in the case of the GPS scintillator is approximately 30 μm.

The thickness of the scintillator layer 22 is preferably equal to or smaller than the thickness that reduces the energy contribution of the other radiations than the measurement target radiation in the scintillator 2 to such an extent that the measurement target radiation can be discriminated from the other radiations, as in the case of the α rays. As shown in FIG. 6, the probability that the neutron beam reacts with the scintillator at the depth of approximately 150 μm, which is five times greater than the mean free path, is approximately 99.3%. On the other hand, in the case of the γ rays, which have an energy lower than 59 KeV, the energy absorption increases as the thickness of the scintillator layer 22 increases, but the probability that the γ rays react with the scintillator layer 22 at the depth of approximately 150 μm can be reduced to approximately 50%. Thus, if the thickness of the scintillator layer 22 is equal to or smaller than approximately 150 μm, more of the energy of the neutron beam is converted into scintillation light than the energy of the γ rays.

Therefore, in the case where the measurement target radiation is the neutron beam, the thickness of the scintillator layer 22 is desirably equal to or greater than 30 μm and equal to or smaller than 150 μm, taking measurement errors into consideration.

In the case where the measurement target radiation is X rays, taking into consideration that X rays are used in a positron emission tomography apparatus or the like for a nuclear medicine image diagnostic method, the average particle diameter d of the scintillator powders 21 is preferably greater than 300 μm, and the thickness of the scintillator layer 22 is desirably equal to or greater than 300 μm and equal to or smaller than 500 μm.

Next, the substrate 3 will be described. The substrate 3 to which the scintillator layer 22 is fixed is not particularly limited in terms of material or size. However, the substrate 3 is preferably made of a material that is hard and can be shaped to have a flat surface, such as a transparent glass or chemical synthetic resin that does not prevent transmission of the scintillation light. In the case where the measurement target radiation is the neutron beam, which has a higher transmission than the α rays or the like, various materials can be used for the substrate 3. For example, an aluminum plate, a silicon plate, an alumina plate or the like can be used, and the substrate 3 may be in close contact with a scintillation light receiving part of a photomultiplier tube 51 described later at the side of the scintillator layer 22. Furthermore, as required, the substrate 3 may have a reflecting surface on the side of the scintillator layer 22. The adhesive 4 used to bond the scintillator powders 21 in a layer to form the scintillator layer 22 is not particularly limited but preferably has radiation-proof properties.

The scintillator plate 1 is not limited to the structure in which the scintillator layer 22 is fixed to the substrate 3. If the scintillator layer 22 has a predetermined strength, the scintillator layer 22 does not necessarily have to be fixed to the substrate 3 and can be used as the scintillator plate 1 by itself.

Figure 7:
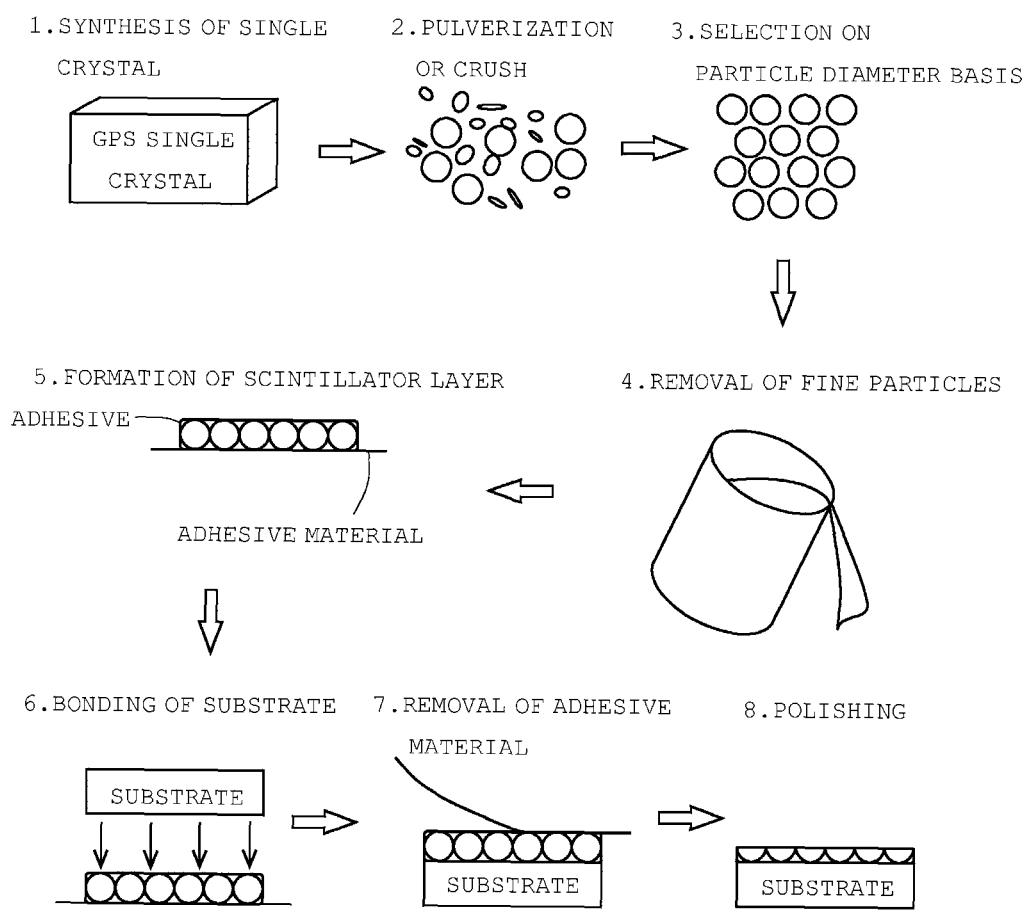
FIG. 7 is a schematic diagram showing steps of a scintillator plate manufacturing method according to the embodiment.
Figure 8:
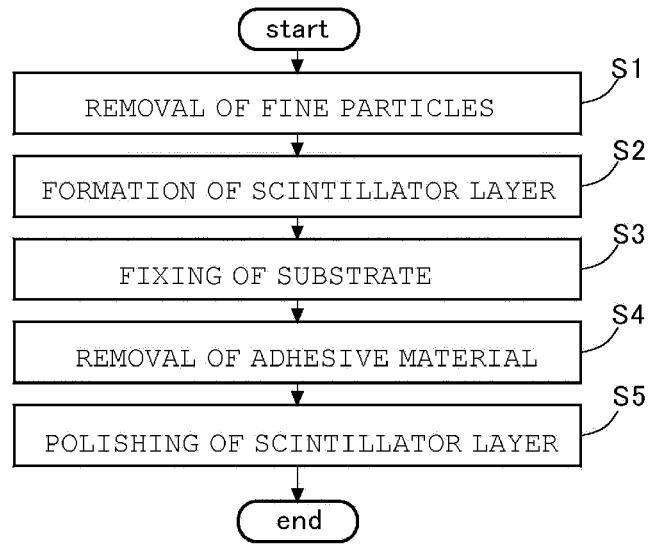
FIG. 8 is a flowchart for illustrating a sequence of the steps of the scintillator plate manufacturing method according to the embodiment.

Next, a scintillator plate manufacturing method according to an embodiment of the present invention will be described. FIG. 7 is a schematic diagram showing steps of the scintillator plate manufacturing method according to this embodiment. FIG. 8 is a flowchart for illustrating a sequence of the steps.

As shown in FIGS. 7 and 8, the scintillator plate manufacturing method according to this embodiment comprises a fine particle removing step S1 of removing the fine particles from the scintillator powders 21 to be used, a scintillator layer forming step S2 of forming the scintillator layer 22 by laying the scintillator powders 21 to be used on a surface of an adhesive material and bonding the scintillator powders 21, a substrate fixing step S3 of fixing the scintillator layer to a substrate, an adhesive material removing step S4 of removing the adhesive material, and a scintillator layer polishing step S5 of polishing a surface of the scintillator layer until the scintillator layer has a predetermined thickness. In the following, each step will be described in detail.

The scintillator powders 21 are prepared by pulverizing the single crystal scintillator 2 and selecting particles with a sieve or the like so that a predetermined average particle diameter is achieved. However, selection with the sieve or the like may not be enough to screen out the fine particles of the scintillator 2 adhering to the scintillator powders 21. Thus, according to this embodiment, those fine particles are removed in the fine particle removing step S1.

The fine particle removing step S1 involves immersing the scintillator powders 21 to be used in a liquid, such as a phosphate solution, an alcohol or water, and agitating the liquid with an ultrasonic cleaning apparatus or the like to separate the fine particles from the scintillator powders 21 and make the scintillator powders 21 and the fine particles diffuse separately in the liquid. Since the scintillator powders and the fine particles settle out at different rates because of the difference in particle diameter, the fine particles can be removed from the scintillator powders by removing the supernatant after a predetermined time. More specifically, the fine particles have a higher surface-area-to-weight ratio than the scintillator powders 21, experience a larger buoyant force and a larger resisting force, which is in proportion to the movement speed, than the scintillator powders 21 and therefore settle out at a lower rate than the scintillator powders 21, so that the fine particles can be removed from the scintillator powders 21.

The scintillator layer forming step S2 is a step of forming the scintillator layer 22 by bonding the scintillator powders 21 having a predetermined average particle diameter by laying the scintillator powders 21 on a surface of an adhesive material, such as an adhesive sheet. Although the adhesive material in the sheet form is used as shown in FIG. 7 according to this embodiment, the present invention is not limited to thereto, and the scintillator powders 21 may be bonded to each other with an adhesive separately applied thereto.

In the scintillator layer forming step according to this embodiment, it is preferred that the nonuniformity of the scintillator powders 21 forming the scintillator layer 22 is eliminated to improve the filling factor, and the scintillator powders 21 are laid in a single layer. To this end, after the scintillator powders 21 are laid on the surface of the adhesive material, the surface of the scintillator layer 22 is swept with a brush, or any scintillator powders 21 that are not bonded to the adhesive material are removed by giving an impact thereto, for example. Once the scintillator powders 21 that are not bonded to the adhesive material are removed, the scintillator powders 21 having the predetermined average particle diameter are laid again in the gaps between the previously laid scintillator powders 21 bonded to the adhesive material. According to this embodiment, this step is repeated at least once.

In the scintillator layer forming step S2 according to this embodiment, after the scintillator powders 21 are laid on the surface of the adhesive material, the scintillator powders 21 are fixed with the suitable adhesive 4, such as an epoxy resin, to form the scintillator layer 22.

The substrate fixing step S3 is a step of fixing the scintillator layer 22 to the substrate 3. According to this embodiment, as shown in FIG. 7, the substrate 3 is applied and fixed to the scintillator layer 22 formed on the surface of the adhesive material with the adhesive 4 or the like. In the case where the scintillator plate 1 is formed without the substrate 3, this step can be omitted. In that case, the adhesive material can serve the function of the substrate 3, or even the adhesive material can be removed so that the scintillator layer 22 forms the scintillator plate 1 by itself. In the case where the opposite surfaces of the scintillator layer 22 are to be polished, the surfaces can be polished before the substrate 3 is fixed to the scintillator layer 22, and the substrate 3 can be fixed to the polished surface.

The adhesive material removing step S4 is a step of removing the adhesive material bonding to the scintillator layer 22. If the adhesive material is an adhesive sheet, the adhesive sheet can be simply peeled off. If the adhesive material has no effect on the incidence of the radiation on the scintillator layer 22 or the transmission of the scintillation light, this step can be omitted, and the scintillator layer 22 with the adhesive material can be used as the scintillator plate 1.

The scintillator layer polishing step S5 is a step of polishing the scintillator layer 22 until the scintillator layer 22 has a predetermined thickness. According to this embodiment, the surface of the scintillator layer exposed by removing the adhesive material in the adhesive material removing step S4 is polished with waterproof abrasive paper. The means for polishing the scintillator layer 22 is not limited to the waterproof abrasive paper, and any means appropriately selected from among a grindstone, a liquid abrasive material and the like can be used.

In the case where the opposite surfaces of the scintillator layer 22 are to be polished, the surface without the adhesive material can be first polished after the scintillator layer 22 is formed in the scintillator layer forming step S2, the polished surface can be fixed to the substrate 3, and the surface exposed by removing the adhesive material can be then polished.

Figure 9:
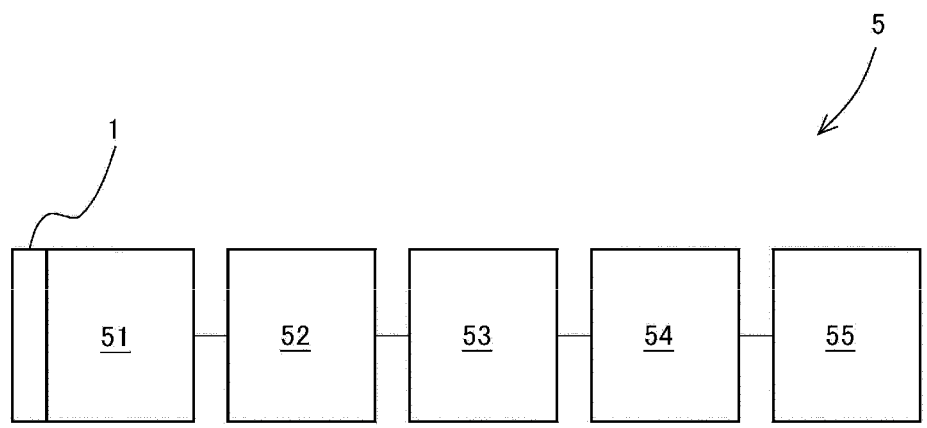
FIG. 9 is a block diagram showing a radiation measuring apparatus according to an embodiment of the present invention.

Next, a radiation measuring apparatus 5 according to this embodiment will be described. As shown in FIG. 9, the radiation measuring apparatus 5 according to this embodiment comprises the scintillator plate 1 described above, a signal converting part 51 that converts the scintillation light emitted by the scintillator plate 1 into an electric signal, an amplifier 52 that amplifies the electric signal, a radiation discriminating part 53 that sets an upper limit value and a lower limit value of the electric signal to discriminate the measurement target radiation and the other radiations from each other, a counting part 54 that counts the discriminated electric pulse signals within the range between the upper limit value and the lower limit value, and a radiation determining part 55 that determines based on the count whether or not the measurement target radiation is incident or not. In the following, each component will be described in detail.

The signal converting part 51 is provided with the scintillator plate 1 at an end thereof, receives the scintillation light emitted by the scintillator plate 1 excited by an incident radiation and converts the scintillation light into an electric signal. According to this embodiment, a photomultiplier tube 51 is used as the signal converting part 51. The photomultiplier tube 51 is configured to convert the received scintillation light into an electric pulse signal.

The amplifier 52 is connected to the photomultiplier tube 51 and arbitrarily amplifies the received electric pulse signal. If the electric pulse signal from the photomultiplier tube 51 is strong enough for discrimination, the amplifier 52 can be omitted.

The radiation discriminating part 53 is connected to the amplifier 52 and sets an upper limit value and a lower limit value to discriminate the measurement target radiation and the other radiations from each other. According to this embodiment, the radiation discriminating part 53 functions as a filter and discriminates the measurement target radiation from the other radiations by transferring the electric pulse signals corresponding to the scintillation light falling within the range between the upper limit value and the lower limit value to the counting part 54.

According to this embodiment, in order to discriminate α rays emitted by plutonium from α rays emitted by a radon daughter nuclide, the upper limit value is set to be slightly greater than the value of the energy of the α rays emitted by plutonium. In addition, in order to discriminate from β rays and γ rays emitted by the radon daughter nuclide present in the measurement environment, for example, the lower limit value is set to be slightly greater than the values of the energy of the β rays and γ rays.

The counting part 54 is connected to the radiation discriminating part 53 and counts the electric pulse signals discriminated by the radiation discriminating part 53. According to this embodiment, the counting part 54 is configured to count the electric pulse signals at predetermined intervals of the focused light intensity.

The radiation determining part 55 is connected to the counting part 54 and determines based on the numerical values obtained from the counting part 54 whether the measurement target radiation is incident or not. More specifically, the radiation determining part 55 is configured to set a threshold, compare the count value with the threshold and determine that the radiation is detected if the count value is greater than the threshold.

Figure 10:
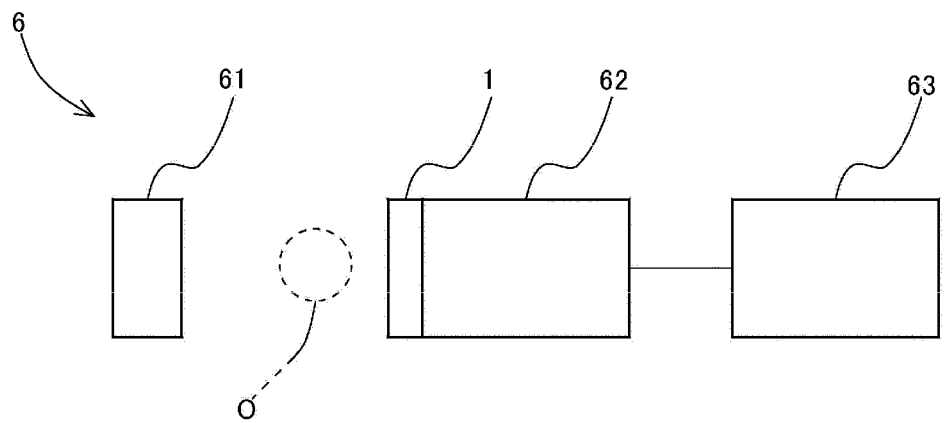
FIG. 10 is a block diagram showing a radiation imaging apparatus according to an embodiment of the present invention.

Next, a radiation imaging apparatus 6 according to this embodiment will be described. As shown in FIG. 10, the radiation imaging apparatus 6 according to this embodiment, which is used in a positron emission tomography apparatus or the like for a nuclear medicine image diagnostic method, mainly comprises a radiation source device 61 that emits an arbitrary radiation, the scintillator plate 1 described above, a scintillation light distribution measuring device 62 that measures the distribution of the scintillation light emitted by the scintillator plate 1 when the radiation emitted by the radiation source device 61 is incident on the scintillator plate 1, and an output device 63 that outputs image data on the distribution of the scintillation light received from the scintillation light distribution measuring device 62. The radiation imaging apparatus 6 can be used not only in the positron emission tomography apparatus but also in an apparatus that measures the distribution of contamination by a radioactive material on a surface of an object, for example.

The radiation source device 61 radially emits an arbitrary radiation. According to this embodiment, the radiation source device 61 is configured to emit X rays. Note that the apparatus that measures the distribution of contamination by a radioactive material does not have to be provided with the radiation source device 61.

The scintillation light distribution measuring device 62 is provided with the scintillator plate 1, is provided at a position where the scintillation light distribution measuring device 62 can receive the radiation emitted by the radiation source device 61, and is configured to receive the radiation emitted by the radiation source device 61 and measures the distribution of the radiation. The method of measuring the scintillation light distribution is not particularly limited, and a plurality of receivers for detecting the scintillation light are arranged to measure the scintillation light distribution, for example.

The output device 63 is connected to the scintillation light distribution measuring device 62 and outputs image data on the received scintillation light distribution. Note that the method of outputting the image data is not particularly limited, and the image data can be displayed on a liquid crystal display or the like or output as a picture.

Next, an effect of each component according to this embodiment will be described.

When the measurement target radiation is incident on the scintillator plate 1, the scintillator plate 1 is excited by the radiation to emit scintillation light. For example, in the case where the measurement target is α rays, which are a directly ionizing radiation, an electrical attraction or repulsion between a charged particle of the α rays and an electron in the scintillator 2 causes excitation of the electron in the scintillator. When recombination of the excited electron then occurs, light is emitted. Since the scintillator layer 22 according to this embodiment has a thickness equal to or greater than the range of the α rays, most of the energy of the incident α rays is converted into scintillation light to be emitted.

The scintillator layer 22 according to this embodiment is formed by a single layer of scintillator powders 21. As a result, a reflection or diffusion of the scintillation light in the scintillator layer 22 can be effectively suppressed. Even if the scintillator powders 21 do not have so great particle diameters, gaps between the scintillator powders 21 laid adjacent to each other in a single layer are filled with further scintillator powders 21, so that the filling factor of the scintillator layer 22 formed by the scintillator powders 21 is improved, and the scintillator layer 22 can achieve effects similar to those of a single crystal.

The photomultiplier tube 51 in the radiation measuring apparatus 5 according to this embodiment receives the scintillation light emitted by the scintillator plate 1 and converts the scintillation light into an electric signal. The amplifier 52 amplifies the electric pulse signal produced by conversion by the photomultiplier tube 51 to an arbitrary magnitude.

The radiation discriminating part 53 compares the electric pulse signal received from the amplifier 52 with the upper limit value and the lower limit value to determine whether the radiation is the measurement target radiation or not. The counting part 54 counts the scintillation light filtered by the radiation discriminating part 53 at predetermined intervals of the focused light intensity. The radiation determining part 55 determines that the measurement target radiation is detected if the count value for the scintillation light is greater than a predetermined threshold. The result of the radiation measurement is then output by appropriate output means.

Next, the radiation imaging apparatus 6 according to this embodiment will be described. The radiation source device 61 irradiates the scintillator plate 1 with an arbitrary radiation. An arbitrary object O whose interior is to be imaged, such as a human body, is disposed between the radiation source device 61 and the scintillator plate 1. When the radiation transmits through the arbitrary object O, if the radiation passes through parts having different transmittances, such as a bone and flesh, the amount of the radiation reaching the scintillator plate 1 varies.

The scintillator plate 1 emits a variable amount of scintillation light depending on the amount of the radiation having reached the scintillator plate 1. The scintillation light distribution measuring device 62 measures the distribution of the scintillation light, and the output device 63 outputs an arbitrary form of data.

According to this embodiment described above, the following advantages are achieved.

1. Since the scintillator layer 22 is formed by the scintillator powders 21 having a predetermined average particle diameter determined by the kind of the scintillator 2 and the kind of the radiation and has a thickness falling within a predetermined range, the scintillation light that can be discriminated can be obtained with higher probability.

2. Since the scintillator powders 21 are laid in a single layer to form the scintillator layer 22, a reflection or diffusion of the scintillation light that would occur in a plurality of layers of scintillator powders 21 can be suppressed.

3. Since the scintillator layer 22 can be formed by laying the scintillator powders 21 having a predetermined particle diameter and polishing the scintillator powders 21 until a predetermined thickness is achieved, the manufacturing cost of the scintillator plate 1 can be substantially reduced, the size of the scintillator plate 1 can be easily increased, and the scintillator plate 1 can be manufactured with higher precision.

4. By using the scintillator plate 1 according to this embodiment, the measurement precision of the radiation measuring apparatus 5 and the radiation imaging apparatus 6 can be improved.

Example 1

In a example 1, the scintillator plate 1 according to the present invention was manufactured, and α rays were measured using the scintillator plate 1.

Manufacture of Scintillator Plate

Figure 11:
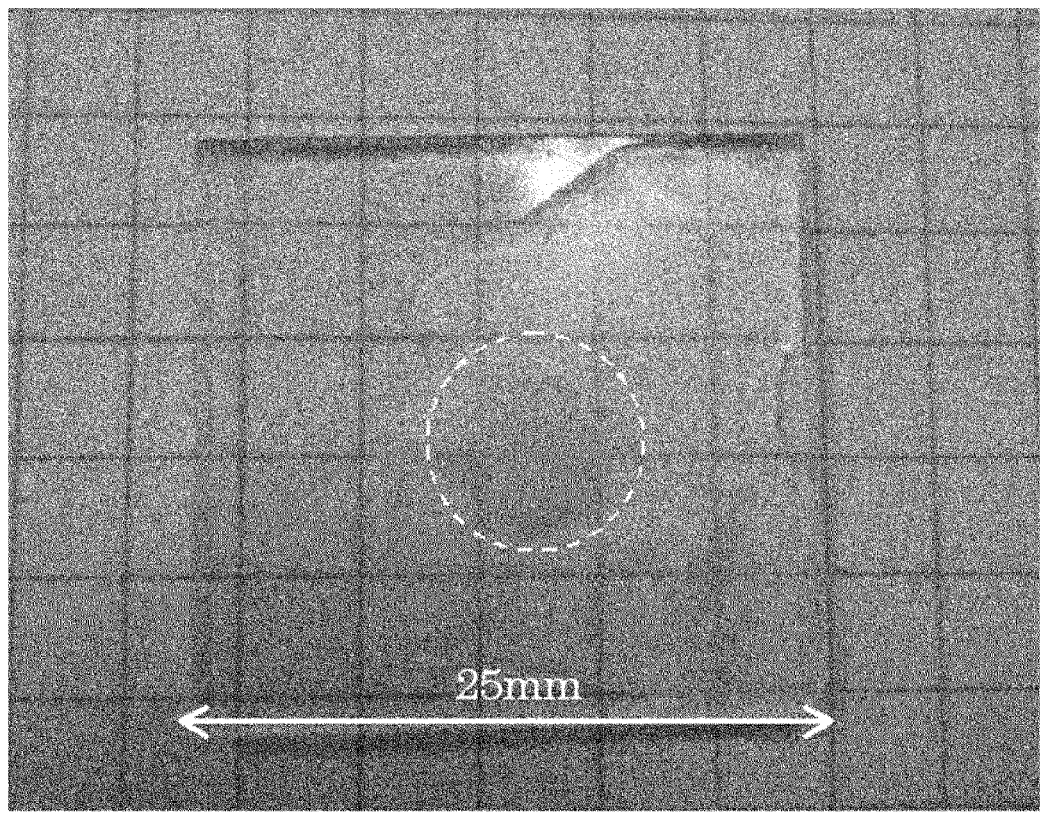
FIG. 11 shows a picture of a GPS scintillator manufactured in a example 1.

In the example 1, a test scintillator plate 1 was manufactured from the GPS scintillator. The GPS scintillator prepared by crystal synthesis in the TSSG method was pulverized, and the resulting particles were screened with a sieve with a predetermined mesh size to select particles having uniform diameters. The substrate was a 25-mm-square rectangular glass plate as shown in FIG. 11, and the scintillator powders 21 were laid on a central part of the glass plate (indicated by the dotted line in FIG. 11) and fixed with the adhesive 4 made of an epoxy resin.

Comparison with Conventional Scintillator

First, α rays were measured with the conventional ZnS scintillator plate according to the invention described in Patent Literature 1, a scintillator plate made of a single crystal GPS scintillator, and the scintillator plate 1 according to the present invention. The ZnS scintillator plate was manufactured by applying the ZnS scintillator to a glass substrate to a thickness of approximately 10 mg/cm$^2$, as with the GPS scintillator plate according to this example 1. The single crystal GPS scintillator used has a thickness of approximately 1.4 mm. In the example 1, three scintillator plates 1, the scintillator layers 22 of which had thicknesses of approximately 100 μm, approximately 50 μm and approximately 30 μm, were prepared by making the scintillator layer 22 with GPS scintillator powders having an average particle diameter d of approximately 50 μm and polishing one surface of the scintillator layer 22.

As an alternative to plutonium, americium 241 (241Am) was used as a radiation source to irradiate each plate with α rays of 5.5 MeV, and the relationship between the focused light intensity and the count was measured.

Figure 12:
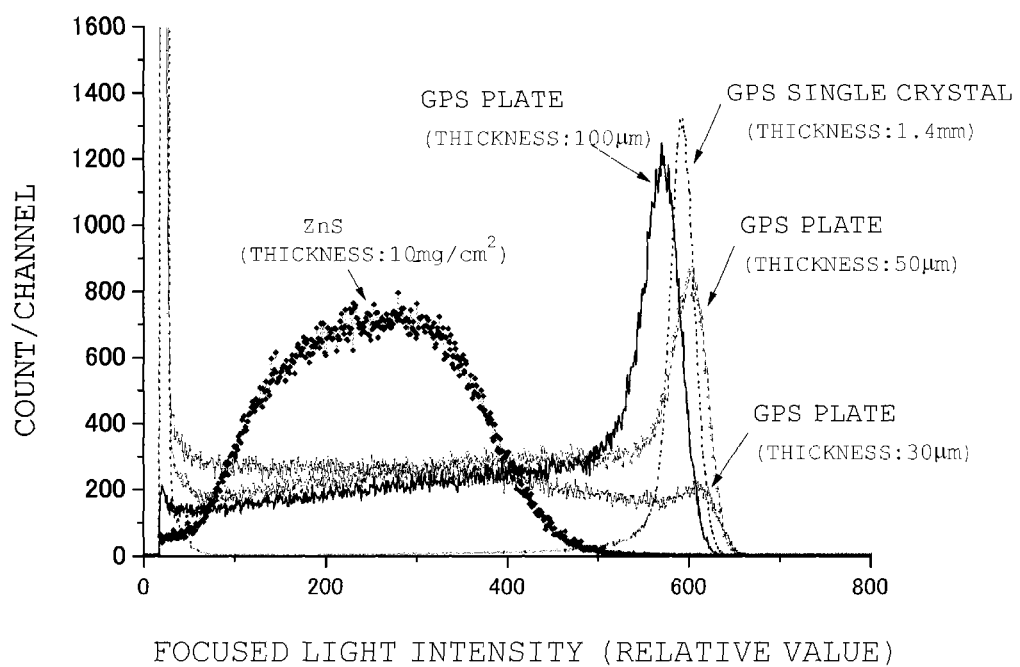
FIG. 12 is a graph showing results of measurement of α rays using a ZnS scintillator, a single crystal GPS scintillator, and a GPS scintillator plate according to the present invention in the example 1.

FIG. 12 is a graph showing the measurement result. For the ZnS scintillator plate, the count distribution curve was smooth with respect to the focused light intensity and showed no sharp peak. This means that the ZnS scintillator plate can be used to measure α rays, but the energy resolution is low, and therefore there still remains a problem that it is difficult to discriminate different kinds of α rays having different amounts of energy emitted from a plurality of nuclides, such as plutonium and a radon daughter nuclide.

On the other hand, the single crystal GPS scintillator showed a sharp peak, which means that α rays can be measured with high precision. Similarly, the GPS scintillator plates having the thickness of approximately 100 μm and approximately 50 μm according to the present invention each showed a sharp peak, although the peak is lower than that of the single crystal GPS scintillator. The GPS scintillator plate having the thickness of approximately 30 μm according to the example 1 showed no sharp peak.

In the example 1, more specific experiments concerning the average particle diameter d of the scintillator powders 21 and the thickness of the scintillator were performed.

Investigation on Average Particle Diameter of Scintillator Powders

First, investigation on the average particle diameter d of the scintillator powders 21 and the measurement precision was performed. Three scintillator plates 1 were prepared with scintillator powders 21 having a particle diameter d equal to or greater than approximately 25 μm and equal to or smaller than approximately 45 μm, scintillator powders 21 having a particle diameter d equal to or greater than approximately 45 μm and equal to or smaller than approximately 75 μm, and scintillator powders 21 having a particle diameter d equal to or greater than approximately 75 μm and equal to or smaller than approximately 106 μm. Americium 241 (241Am) was used as a radiation source to irradiate each scintillator plate 1 with α rays of 5.5 MeV, and the relationship between the focused light intensity and the count was measured.

Figure 13:
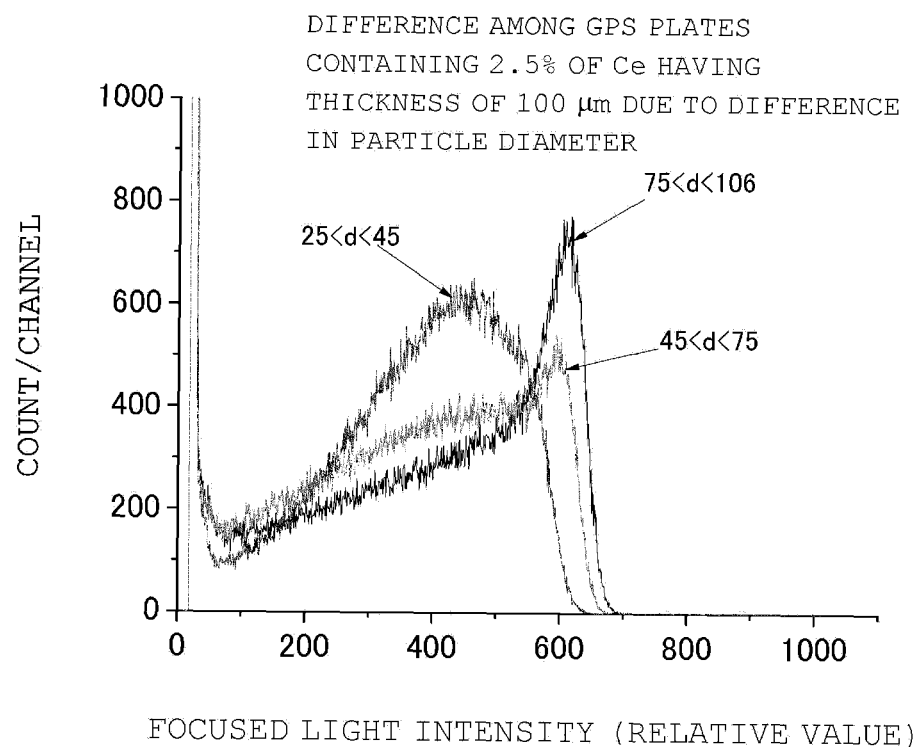
FIG. 13 is a graph showing results of measurement of α rays using GPS scintillator plates having different average particle diameters in the example 1.

FIG. 13 is a graph showing the measurement result. In the case where the particle diameter d of the scintillator powders 21 was equal to or greater than approximately 25 μm and equal to or smaller than approximately 45 μm, a peak of the focused light intensity appeared, which means that α rays were detected. The distribution curve of the focused light intensity was smoother than the cases of the other two scintillator plates, which means that the discrimination precision was inferior. In the case where the particle diameter d of the scintillator powders 21 was equal to or greater than approximately 45 μm and equal to or smaller than approximately 75 μm, a peak of the focused light intensity appeared at greater values, and it can be said that the discrimination precision was improved compared with the case where the particle diameter d of the scintillator powders 21 was equal to or greater than approximately 25 μm and equal to or smaller than approximately 45 μm. In the case where the particle diameter d of the scintillator powders 21 was equal to or greater than approximately 75 μm and equal to or smaller than approximately 106 μm, a peak of the focused light intensity appeared at greater values within a narrower range than in the cases of the other two scintillator plates, and it is sufficiently possible that the discrimination precision was improved.

In short, it can be expected that the discrimination precision at greater values of the focused light intensity improves as the average particle diameter d of the scintillator powders 21 increases.

Investigation on Thickness of Scintillator

Next, investigation on the thickness of the scintillator 2 was performed for measurement of α rays and discrimination of the α rays from γ rays present in the measurement environment. In the example 1, three scintillator plates 1 were manufactured from the scintillator powders 21 having an average particle diameter d of 50 μm, and the surfaces of the scintillator plates 1 were polished so that the scintillators 2 thereof had different thicknesses, 100 μm, 50 μmm and 30 μm. Cesium (Cs) was used as a radiation source to irradiate each scintillator plate 1 with γ rays of 662 keV, and the relationship between the focused light intensity and the count was measured. For comparison, the measurement was performed for a single crystal GPS scintillator having a thickness of approximately 1.4 mm.

Figure 14:
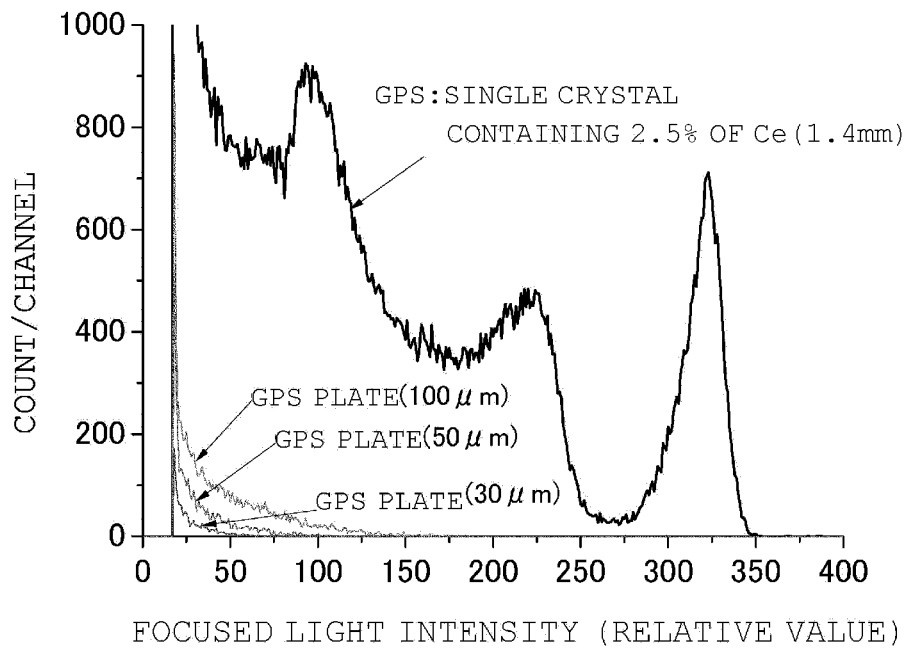
FIG. 14 is a graph showing a relationship between the result of measurement of γ rays using the GPS scintillator and the thickness of the GPS scintillator in the example 1.

FIG. 14 is a graph showing the measurement result. As shown in FIG. 14, in the case of the single crystal GPS scintillator, the focused light intensity was counted over a wide range. When the focused light intensity is counted over such a wide range, it is difficult to discriminate the target radiation from the other radiations.

On the other hand, in the case of the scintillator plates 1 manufactured in the example 1, the focused light intensity distribution was concentrated in narrow ranges. In particular, the focused light intensity distribution was concentrated in narrower ranges as the thickness of the scintillator 2 decreased from 100 μm to 50 μm and to 30 μm. In short, it can be seen that the smaller the thickness of the scintillator 2, the more effectively the effect of the γ rays can be suppressed, and the more easily the α rays can be discriminated.

Summary of Average Particle Diameter of Scintillator Powders

Next, the scintillator plate having a thickness of approximately 50 μm was manufactured from the GPS scintillator powders 21 having an average particle diameter d of 50 μm. Americium 241 (241Am) was used as a radiation source to irradiate the scintillator plate with α rays of 5.5 MeV, cesium (Cs) was used as a radiation source to irradiate the scintillator plate with γ rays of 662 keV, and the relationships between the focused light intensity and the count were measured.

Figure 15:
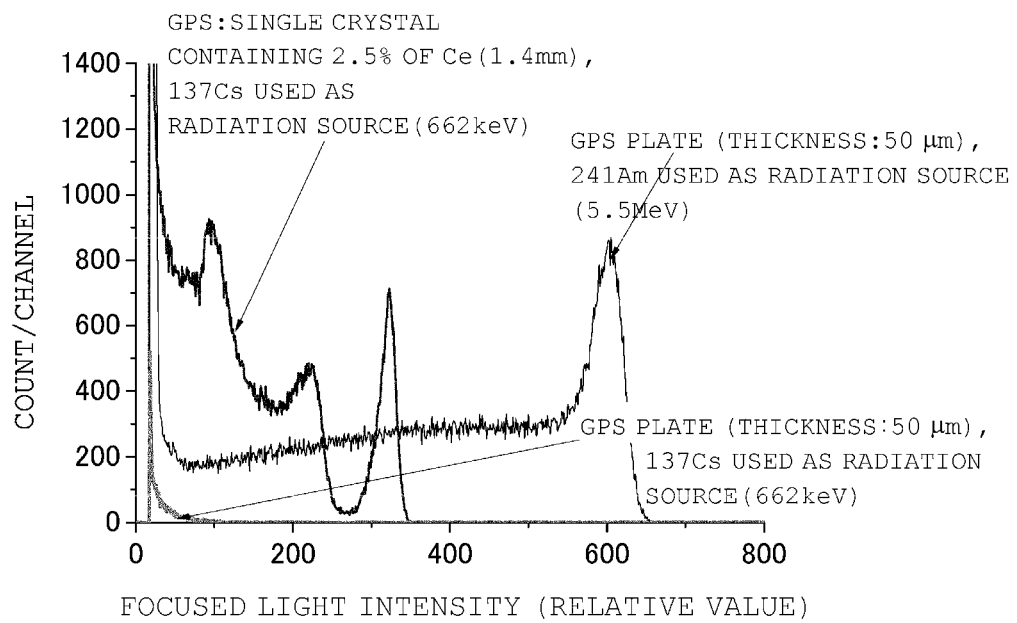
FIG. 15 is a graph showing results of measurement of α rays emitted by americium 241 (241Am) as a radiation source and γ rays emitted by cesium 137 (137Cs) as a radiation source using the GPS scintillator plate according to the present invention in the example 1.

FIG. 15 is a graph showing the measurement results. The scintillator plate 1 in the example 1 was able to detect the α rays and discriminate the α rays from the γ rays. It is considered that the α rays and the γ rays can be discriminated from each other with reliability if the lower limit value and the upper limit value of the focused light intensity for discrimination are set at approximately 100 and approximately 650, respectively.

Example 2

Next, a example 2 will be described. In the example 2, an experiment was performed on the effect, on the detection precision, of the difference between the case where the scintillator layer 22 is formed by a single layer of scintillator powders 21 and the case where the scintillator layer 22 is formed by a plurality of layers scintillator powders 21.

Manufacture of Scintillator Plate

In the example 2, as in the example 1, test scintillator plates 1 were manufactured from the GPS scintillator. The scintillator powders 21 used for the scintillator plates 1 in the example 2 had the following particle diameters.
(a) d<5 μm
(b) 25 μm<d<45 μm
(c) 45 μm<d<75 μm
(d) 75 μm<d<106 μm
(e) 75 μm<d<106 μm (fine particles were removed)
(f) 180 μm<d<212 μm (fine particles were removed)
(g) 212 μm<d<250 μm (fine particles were removed)
(h) 250 μm<d<300 μm (fine particles were removed)
(i) 500 μm<d<600 μm (fine particles were removed)

For the test pieces (a) to (d), the scintillator powders 21 were screened with a sieve with a predetermined mesh size to have a uniform particle diameter. For the test pieces (e) to (i), after the scintillator powders 21 were screened with a sieve to have a uniform particle diameter, fine particles of the scintillator 2 adhering to the scintillator powders 21 were removed by immersing the scintillator powders 21 in a phosphate solution, agitating the liquid with an ultrasonic cleaning device to separately diffuse the scintillator powders 21 and the fine particles, and removing the supernatant. In the example 2, the substrate 3 was a 25-mm-square rectangular glass plate, as in the example 1.

With the scintillator plates 1 in the example 2, the scintillator layer 22 was formed by laying the scintillator powders 21 on the substrate 3 and fixing the scintillator powders 21. With the test pieces (a) to (h), one surface of the scintillator layer 22 was polished to adjust the thickness of the scintillator layer 22 to approximately 100 μm. With the test piece (i), both surfaces of the scintillator layer 22 were polished to adjust the thickness of the scintillator layer 22 to approximately 100 μm.

In the example 2, the scintillator layers 22 of the scintillator plates 1 of the test pieces (a) to (c) were formed by laying the scintillator powders 21 in a plurality of layers, and the scintillator layers 22 of the scintillator plates 1 of the test pieces (d) to (i) were formed by laying the scintillator powders 21 in a single layer.

Figure 16:
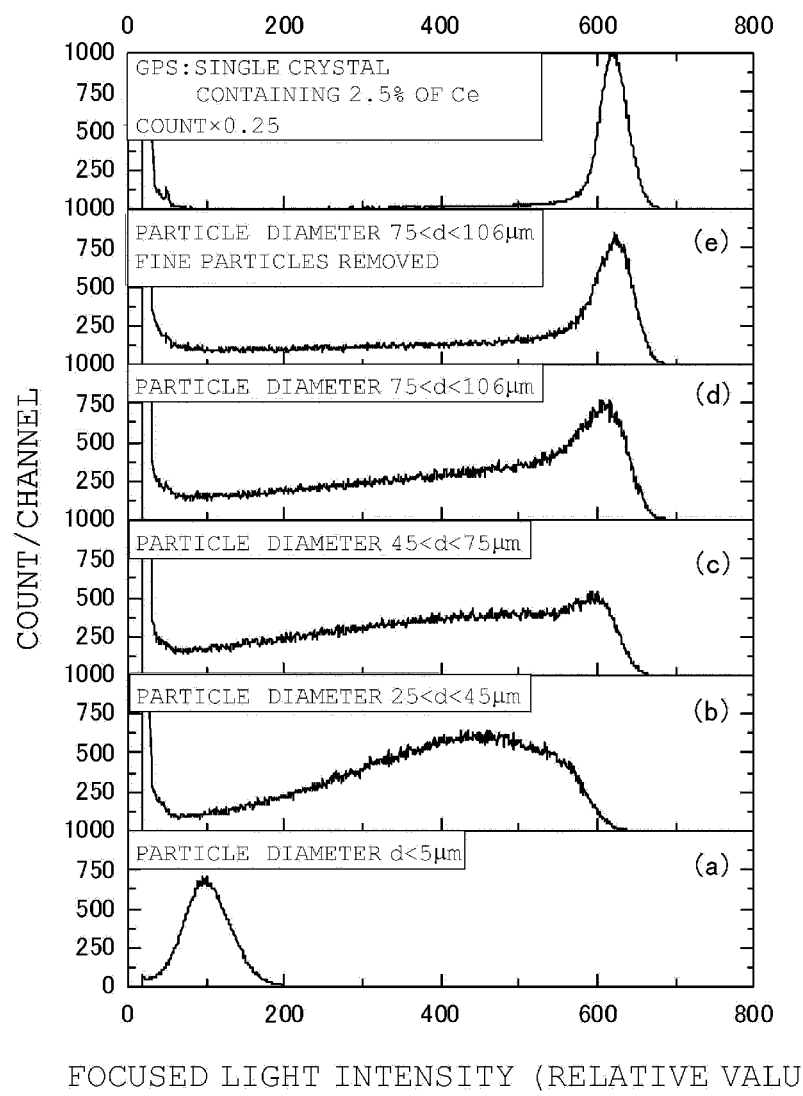
FIG. 16 is a graph showing relationships between the focused light intensity and the count of α rays measured using scintillator plates in a example 2.

Investigation on Scintillator Layers with Single Layer Structure and Scintillator Layers with Multilayer Structure In the example 2, as in the example 1, as an alternative to plutonium, americium 241 (241Am) was used as a radiation source to irradiate each plate with α rays of 5.5 MeV, and the relationship between the focused light intensity and the count was measured. FIG. 16 is a graph showing the measurement results of the scintillator plates of the test pieces (a) to (e) and the measurement result of a scintillator plate of a GPS scintillator single crystal as a comparative example.

As shown in FIG. 16, in the case where the GPS scintillator single crystal was used, a count peak appeared in the vicinity of the focused light intensity of 600.

On the other hand, with the scintillator plate 1 made of the scintillator powders 21 of the test piece (a), little signals were detected at focused light intensities equal to or higher than 200, and α rays having different amounts of energy emitted by a plurality of nuclides was not able to be discriminated from each other. This is probably because even if the scintillator layer 22 has a thickness equal to or greater than a predetermined value, sufficient scintillator light cannot be emitted if the particle diameter of the scintillator powders 21 is smaller than the range.

With the scintillator plates 1 made of the scintillator powders 21 of the test pieces (b) to (d), the peak became more recognizable as the particle diameter increases. Comparing the measurement results of the scintillator plates 1 made of the scintillator powders 21 of the test pieces (d) and (e) having the same particle diameter, the peak was more obvious in the case of the test piece (e) from which fine particles were removed. These are probably because, with the test piece (e), the scintillator powders 21 were laid in a single layer, and fine particles were removed from the scintillator powders 21, so that the scintillator powders 21 were not overlaid one on another, and the scintillation light was more likely to reach the photomultiplier tube 51, while for the test pieces (b) to (d), the scintillator powders 21 were overlaid one on another, so that a diffuse reflection of the scintillation light occurred, and the amount of scintillation light reaching the photomultiplier tube 51 decreased.

Figure 17:
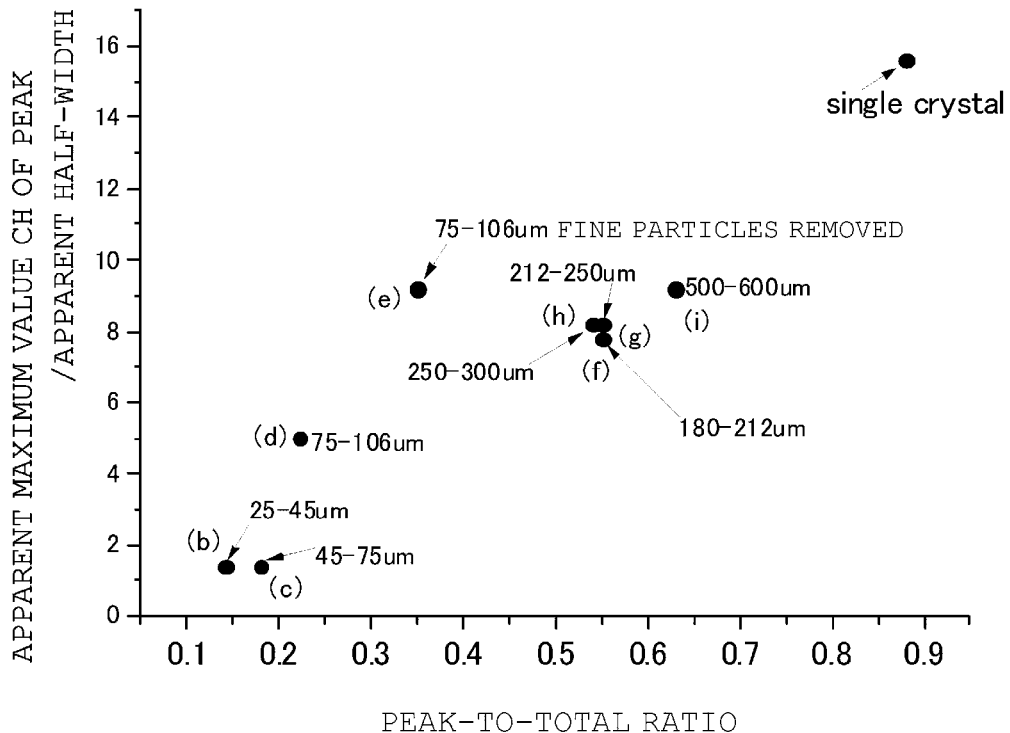
FIG. 17 is a graph showing relationships between the peak-to-total ratio and the inverse of the resolution determined based on the relationships between the focused light intensity and the count of α rays measured using the scintillator plates in the example 2.

Next, the measurement results of the scintillator plates 1 made of the scintillator powders 21 of the test pieces (a) to (i) were compared in terms of the inverse of the resolution and the peak-to-total ratio calculated. FIG. 17 is a graph showing the peak-to-total ratio and the inverse of the resolution based on the measurement results in the example 2.

Figure 18:
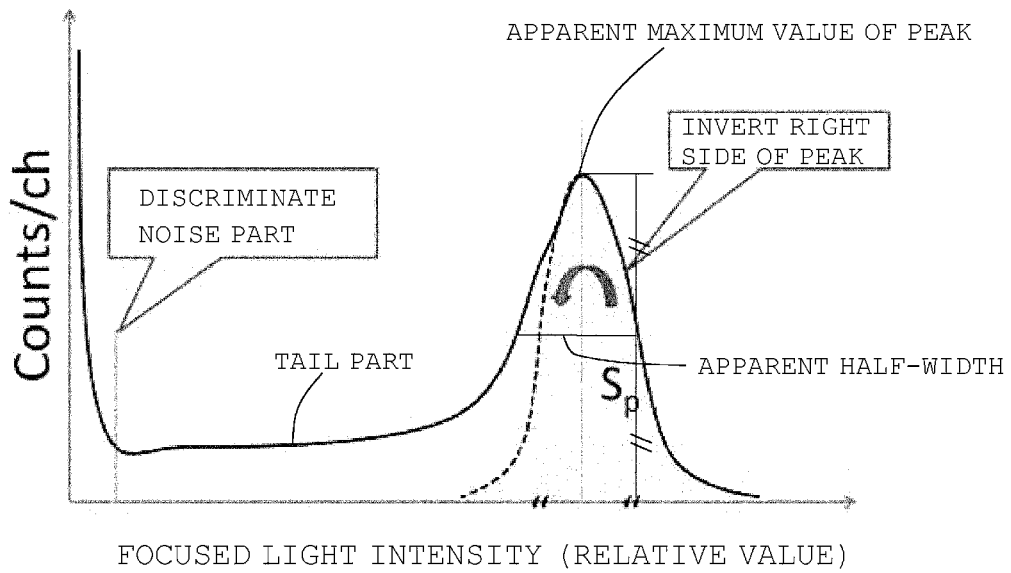
FIG. 18 is a schematic diagram for illustrating a method of calculating the peak-to-total ratio and the inverse of the resolution in the example 2.

In the example 2, as shown in FIGS. 17 and 18, the inverse of the resolution was calculated as a ratio between the apparent maximum value of the peak of the count and the apparent half-width at the apparent maximum value of the peak. That is, the greater the inverse of the resolution shown on the longitudinal axis of FIG. 17, the sharper the peak becomes, and the higher the energy discriminating capability becomes.

In the example 2, the peak-to-total ratio means the value of the count at the peak with respect to the count for the entire focused light intensity range. That is, the higher the peak-to-total ratio, the count in the tail part in FIG. 18 decreases, the count at the peak increases, and the energy discriminating capability becomes higher.

As shown in FIG. 17, in the case of the single crystal scintillator plate, both the inverse of the resolution and the peak-to-total ratio are high, which shows that the energy discriminating capability is high.

In the cases of the test pieces (b) and (c) in which the scintillator layer had a multilayer structure, the inverse of the resolution and the peak-to-total ratio were low, specifically, the inverse of the resolution was approximately a tenth of the value of the single crystal, the peak-to-total ratio was approximately a fifth of the value of the single crystal, and the energy discriminating capability was low.

On the other hand, in the cases of the test pieces (d) to (i) in which the scintillator layer had a single layer structure, the inverse of the resolution and the peak-to-total ratio were improved compared with the test pieces (b) and (c). For example, with the test pieces (d) to (i), the inverse of the resolution was approximately 60% of the value of the single crystal, and a sufficient energy discriminating capability was maintained. The efficiency of detection of the peak-to-total ratio tended to improve as the average particle diameter d of the scintillator powders 21 increased. With the test piece (i), the energy discriminating capability was maintained at approximately 70% of that in the case of the single crystal.

Figure 19:
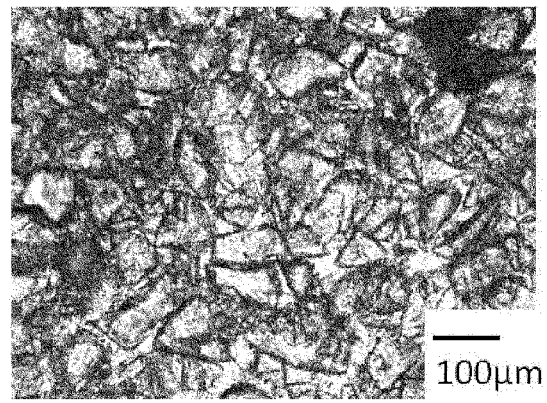
FIG. 19 is an optical microscopic picture of a polished surface of a test piece (d) in the example 2.
Figure 20:
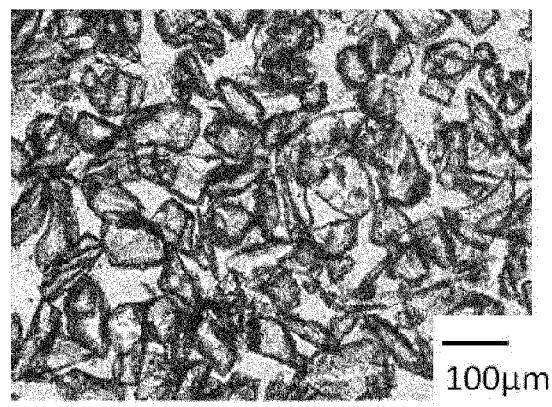
FIG. 20 is an optical microscopic picture of a polished surface of a test piece (e) in the example 2.
Figure 21:
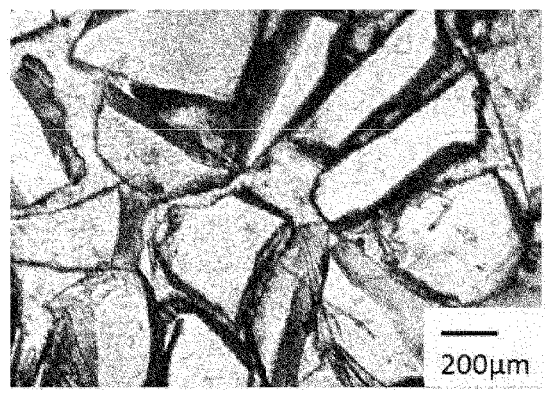
FIG. 21 is an optical microscopic picture of a polished surface of a test piece (i) in the example 2.

Next, a picture of the scintillator layer 22 of each scintillator plate 1 was taken with an optical microscope, and the difference in precision was investigated based on the images. FIGS. 19 to 21 are optical microscopic pictures of the scintillator layers 22 of the scintillator plates 1 made of the scintillator powders 21 of the test pieces (d), (e) and (i), respectively.

As shown in the optical microscopic picture of FIG. 19, before the fine particles were removed, the fine particles were randomly fitted in the gaps between the scintillator powders 21, and a diffuse reflection of light occurred. On the other hand, as shown in FIG. 20, in the case of the test piece (e) in which the fine particles were removed, the predetermined scintillator powders 21 were laid substantially in a single layer, and a reflection or diffusion of light was suppressed.

As shown in FIG. 21, in the case where the scintillator layer 22 was made of relatively large scintillator powders 21, and both surfaces of the scintillator layer 22 were polished, each scintillator powder 21 had a plate-like shape. As a result, it can be considered that the scintillator powders 21 had surfaces parallel with the detection surface of the photomultiplier tube 51, and a diffuse reflection of the scintillation light was less likely to occur. The gaps between the scintillator powders 21 were reduced, and the result of the image processing showed that the filling factor was as high as approximately 70%, and therefore, it can be said that the scintillator layer 22 had a structure similar to the single crystal. As shown in FIG. 17, in the example 2, the scintillator plate 1 made of the scintillator powders 21 of the test piece (i) achieved a detection efficiency of 70%.

Summary of Scintillator Layer with Single Layer Structure and Scintillator Layer with Multilayer Structure As can be seen from the above description, the energy discriminating capability of the scintillator powders 21 forming the scintillator layer 22 is improved by suppressing the diffuse reflection of the scintillation light. To this end, it is essential that the scintillator powders are not overlaid one on another, and it can be said that the scintillator powders laid in a single layer have a higher energy discriminating capability than the scintillator powders laid in a plurality of layers. Furthermore, if scintillator powders 21 having a larger average particle diameter are laid in a single layer and polished to a predetermined thickness, the scintillator powders 21 have more surfaces parallel with the detection surface of the photomultiplier tube 51, and the ratio of the scintillator exposed on the surface of the plate increases. As a result, the energy of the measurement target α rays is imparted to the scintillator 3 without loss. It can be considered that the high energy discriminating capability is achieved a result of that. In addition, it can be seen that the higher the filling factor of the scintillator layer 22 formed by the scintillator powders 21, the detection efficiency improves.

Example 3

Figure 22:
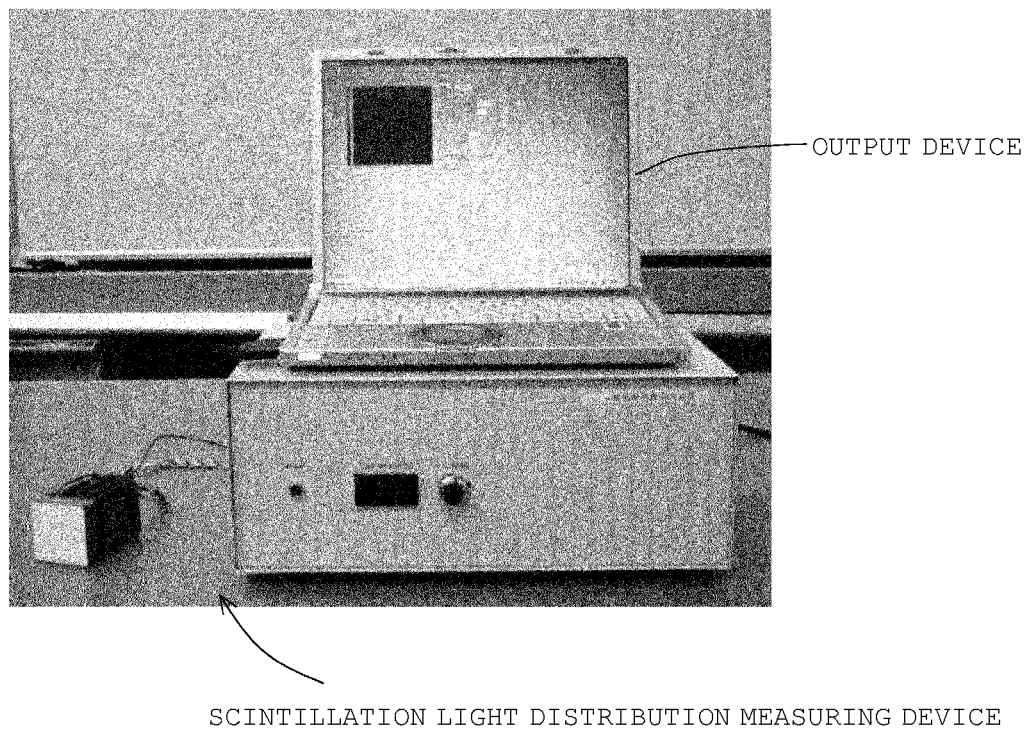
FIG. 22 is a picture of a radiation imaging apparatus in a example 3.

In a example 3, the radiation imaging apparatus 6 used as an apparatus that measures the distribution of contamination by a radioactive material on a surface of an object was fabricated, and the radioactivity distribution was measured. FIG. 22 shows an appearance of the fabricated radiation imaging apparatus 6.

As shown in FIG. 22, the radiation imaging apparatus 6 in the example 3 comprised the scintillation light distribution measuring device 62 provided with the scintillator plate 1, and the output device 63 that outputs image data on the distribution.

The scintillator plate 1 used in the example 3 was a GPS scintillator plate. The scintillation light distribution measuring device 62 used was a multichannel photomultiplier tube (manufactured by Hamamatsu Photonics K.K.), and 64 (8 by 8) measurement points were set in a 5 cm-by-5 cm substantially square detection area.

In the example 3, an α rays emitting nuclide was appropriately sprayed on the measurement surface, the multichannel photomultiplier tube was set to face the measurement surface, and the distribution of the radiations emitted from the α rays emitting nuclide was measured by measuring the pulse height spectra of the α rays at all the measurement points at the same time.

Figures 23, 24:
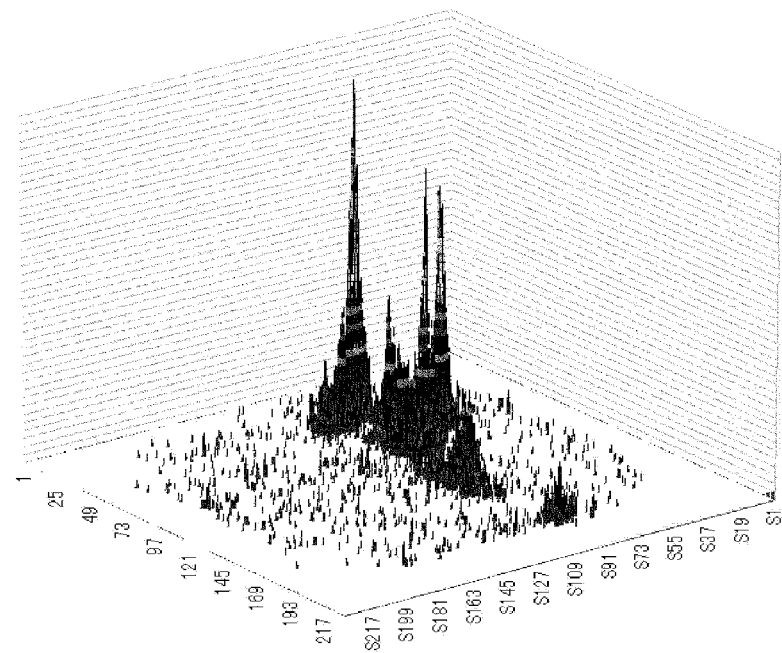
FIG. 23 is a three-dimensional graph showing the radioactivity intensity distribution measured by the radiation imaging apparatus in the example 3.
FIG. 24 is a picture of a measurement sample set in a example 4.

FIG. 23 is a diagram showing the measured radioactivity intensity distribution, in which the values between the measurement points were linearly calculated from the radioactivity intensities at the measurement points measured with the scintillation light distribution measuring device 62 and expressed in a 256 by 256 data matrix. The level of the lines in the graph represents the radioactivity intensity.

As shown in FIG. 23, the radioactivity intensity is low at some points and high at other points, and the parts in which there is the α rays emitting nuclide and the parts in which there is not the α rays emitting nuclide can be clearly discriminated. Therefore, even if there is a radiation source that emits a radiation that is not the measurement target, the radiation can be adequately discriminated.

As described above, in the example 3, the radiation distribution measurement is sufficiently feasible if the scintillator plate 1 according to the present invention is used. This also shows the feasibility of increasing the size of the scintillator plate 1.

Example 4

In a example 4, a neutron beam was measured. The scintillators used were a lithium(Li)-6 scintillator, a ZnS scintillator and the GPS scintillator according to the present invention. Using these scintillators, the measurement was performed with a neutron imaging system incorporating a resistance distributed position detecting photomultiplier tube. Note that the Li-6 glass scintillator is a material known for its high detection precision.

In the example 4, as shown in FIG. 24, an F-character-shaped plate made of cadmium as a measurement sample was set and irradiated with a neutron beam, and the distribution of the neutron beams at the rear of the plate was measured. Note that cadmium has a property to absorb neutrons.

Figure 25:
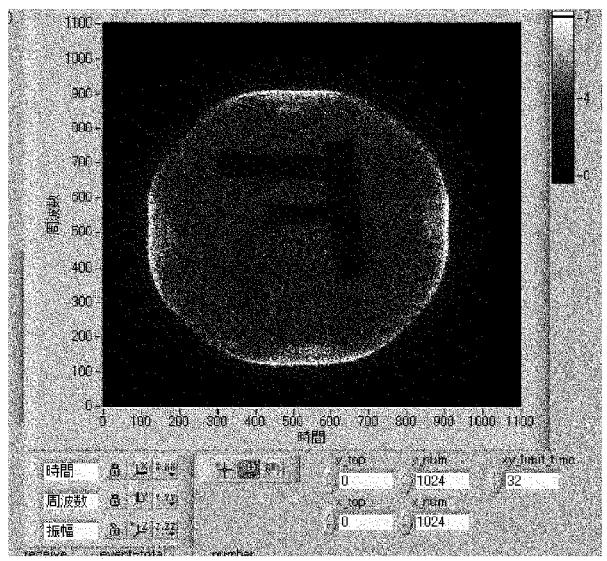
FIG. 25 shows an output image of a radiation imaging apparatus that shows a neutron distribution measured with a conventional ZnS scintillator in the example 4.

FIG. 25 shows the result of the measurement using the ZnS scintillator. As shown in FIG. 25, the cadmium absorbed neutrons, so that no neutrons were measured and the character "F" clearly appeared at the rear of the cadmium.

Figure 26:
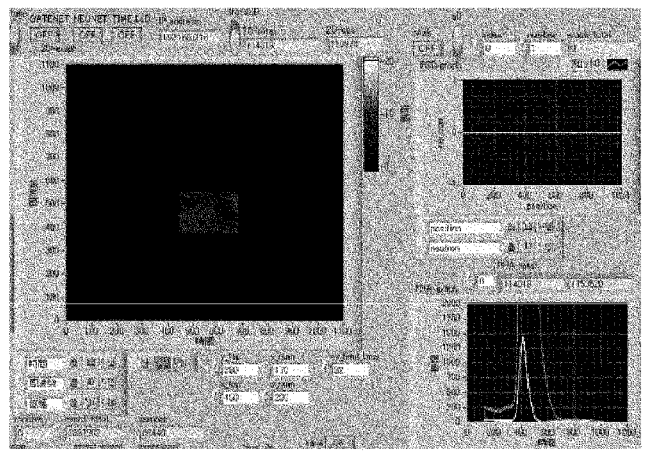
FIG. 26 shows an output image of the radiation imaging apparatus showing an extracted part of the neutron distribution measured with a conventional Li-6 glass scintillator in the example 4.
Figure 27:
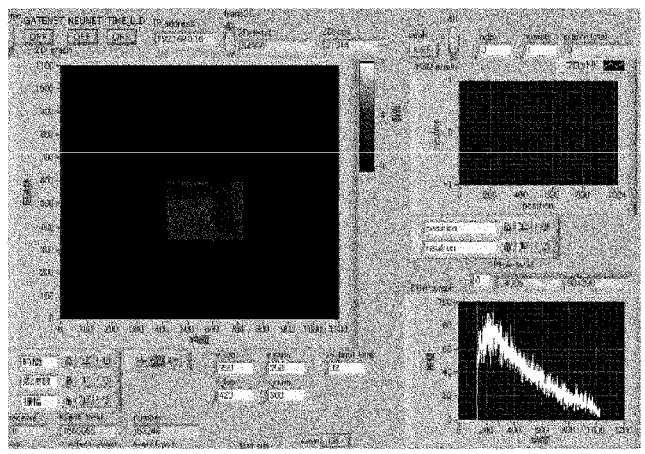
FIG. 27 shows an output image of the radiation imaging apparatus showing an extracted part of the neutron distribution measured with a conventional ZnS scintillator in the example 4.
Figure 28:
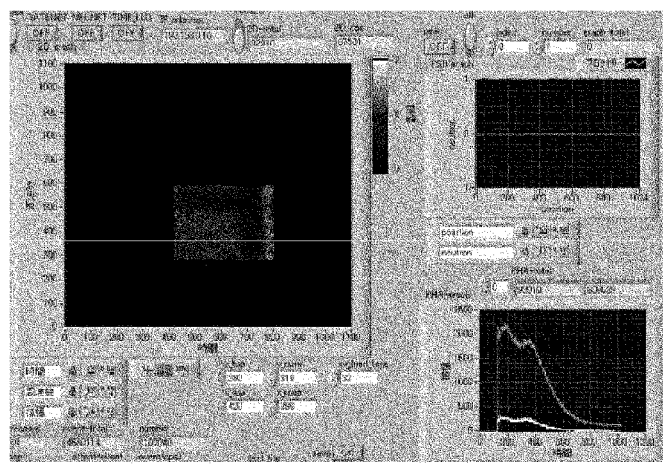
FIG. 28 shows an output image of the radiation imaging apparatus showing an extracted part of the neutron distribution measured with the GPS scintillator according to the present invention in the example 4.

Since the plates had different shapes and sizes, the corresponding areas of the plates extracted from the images of the plates were then compared. FIG. 26 shows the measurement result in the case where the Li-6 glass scintillator was used, FIG. 27 shows the measurement result in the case where the ZnS scintillator was used, and FIG. 28 shows the measurement result in the case where the GPS scintillator was used. In FIGS. 26 to 28, the total number of the neutrons in each area was counted.

The total number of neutrons in the case where the Li-6 glass scintillator was used was 114319, which was the largest of all the cases. On the assumption that the total number in the case where the Li-6 glass scintillator was used was 100, the relative total numbers of neutrons in the cases where the other scintillators were used was determined. Then, the total number in the case where the ZnS scintillator was used was approximately 30, and the total number in the case where the GPS scintillator was used was approximately 81.

From the above description, it is proved that the scintillator plate 1 according to the present invention can be used to measure the neutron beam. In addition, the scintillator plate 1 according to the present invention is also effective for measurement for radiation imaging. In addition, the GPS scintillator according to the present invention has a higher detection precision than the ZnS scintillator. Furthermore, the GPS scintillator according to the present invention has a high precision that is approximately 81% of that of the Li-6 glass scintillator, which is known for its high detection precision. Thus, the scintillator plate according to the present invention has high practicality not only in terms of cost but also in terms of precision.

REFERENCE SIGNS LIST 1 scintillator plate
2 scintillator
3 substrate
4 adhesive
5 radiation measuring apparatus
6 radiation imaging apparatus
21 scintillator powder
51 signal converting part (photomultiplier tube)
52 amplifier
53 radiation discriminating part
54 counting part
55 radiation determining part
61 radiation source device
62 scintillation light distribution measuring device
63 output device

The invention claimed is:
1. A scintillator plate containing a scintillator that is excited by an incident radiation to emit scintillation light, comprising:
   a substrate that has a flat surface, wherein
   in a case where a measurement target radiation is any of α rays, an electron beam and an ion beam, the scintillator plate has a scintillator layer, which is selected from GPS scintillator, ZnS scintillator or YAP scintillator, composed with scintillator grains that are laid on the flat surface of the substrate, the scintillator grains having an average particle diameter that is ranged between 75 µm and 600 µm, and
one or both of surfaces of said scintillator layer is polished so that the thickness of said scintillator layer is equal to or greater than 20 µm and equal to or smaller than 100 µm.

2. The scintillator plate according to claim 1, wherein
said scintillator layer has a single layer structure formed by laying the scintillator grains in a single layer, and
the substrate is made of a transparent material.

3. A radiation measuring apparatus having said scintillator plate according to claim 1, the radiation measuring apparatus comprising:
said scintillator plate;
a signal converting part that converts scintillation light emitted by the scintillator plate into an electric signal;
a radiation discriminating part that discriminates a measurement target radiation and another radiation from each other based on an upper limit value and a lower limit value of the intensity of said electric signal that are set depending on the kind of said measurement target radiation;
a counting part that counts discriminated electric signals of said measurement target radiation; and
a radiation determining part that determines the presence or absence of the measurement target radiation by comparison between a count from said counting part and a predetermined threshold.

4. A scintillator plate manufacturing method of manufacturing the scintillator plate according to claim 1, the method comprising:
a scintillator layer forming step of forming a scintillator layer by laying the scintillator grains having a predetermined average particle diameter on a surface of an adhesive material that is disposed on the substrate and bonding the scintillator grains; and
a scintillator layer polishing step of polishing one or both of surfaces of said scintillator layer until the scintillator layer has a predetermined thickness.

5. The scintillator plate manufacturing method according to claim 4, wherein
in said scintillator layer forming step, a sub-step of removing the scintillator grains that are not bonded to the surface of said adhesive material and laying the scintillator grains having the predetermined average particle diameter in gaps between the scintillator grains bonded to the surface of said adhesive material is repeated at least once.

6. A scintillator plate containing a scintillator that is excited by an incident radiation to emit scintillation light, wherein
in a case where a measurement target radiation is a neutron beam, the scintillator plate has a scintillator layer formed by laying scintillator powders having an average particle diameter equal to or greater than a mean free path of said neutron beam in said scintillator.

7. The scintillator plate according to claim 6, wherein
one or both of surfaces of said scintillator layer is polished so that the thickness of said scintillator layer is equal to or greater than 30 µm and equal to or smaller than 150 µm.

8. The scintillator plate according to claim 6, wherein
said scintillator layer has a single layer structure formed by laying said scintillator powders in a single layer.

9. The scintillator plate according to claim 8, wherein
said scintillator layer is formed by embedding the scintillator powders having an average particle diameter equal to or greater than the average particle diameter of said scintillator powders determined by the kind of said radiation in a gap between said scintillator powders adjacent to each other laid in a single layer, and one or both of surfaces of the scintillator layer is polished.

10. A radiation measuring apparatus having said scintillator plate according to claim 6, the radiation measuring apparatus comprising:
said scintillator plate;
a signal converting part that converts scintillation light emitted by the scintillator plate into an electric signal;
a radiation discriminating part that discriminates a measurement target radiation and another radiation from each other based on an upper limit value and a lower limit value of the intensity of said electric signal that are set depending on the kind of said measurement target radiation;
a counting part that counts discriminated electric signals of said measurement target radiation; and
a radiation determining part that determines the presence or absence of the measurement target radiation by comparison between a count from said counting part and a predetermined threshold.

11. A scintillator plate manufacturing method of manufacturing the scintillator plate according to claim 6, the method comprising:
a scintillator layer forming step of forming a scintillator layer by laying scintillator powders having a predetermined average particle diameter on a surface of an adhesive material and bonding the scintillator powders; and
a scintillator layer polishing step of polishing one or both of surfaces of said scintillator layer until the scintillator layer has a predetermined thickness.

12. The scintillator plate manufacturing method according to claim 11, wherein
in said scintillator layer forming step, a sub-step of removing scintillator powders that are not bonded to the surface of said adhesive material and laying the scintillator powders having the predetermined average particle diameter in gaps between the scintillator powders bonded to the surface of said adhesive material is repeated at least once.

13. A scintillator plate containing a scintillator that is excited by an incident radiation to emit scintillation light, wherein
in a case where a measurement target radiation is X rays, the scintillator plate has a scintillator layer formed by laying scintillator powders having an average particle diameter greater than 300 µm, and one or both of surfaces of the scintillator layer is polished so that the thickness of said scintillator layer is equal to or greater than 300 µm and equal to or smaller than 500 µm,
said scintillator layer has a single layer structure in which said scintillator powders are accumulated no more than two layers,
in said scintillator layer, said scintillator powders (21x) are arranged on the surface with gaps (Gh, Gv) defined by said scintillator powders (21x) adjacent to each other laid in the single layer structure, and
said scintillator layer is further formed by embedding other scintillator powders (21y) having an average particle diameter equal to or greater than 300 µm, but smaller than that of said scintillator powders (21x), and being made of the same material as said scintillator powders (21x) determined by the kind of said radiation.

14. A radiation measuring apparatus having said scintillator plate according to claim 13, the radiation measuring apparatus comprising:
   said scintillator plate;
   a signal converting part that converts scintillation light emitted by the scintillator plate into an electric signal;
   a radiation discriminating part that discriminates a measurement target radiation and another radiation from each other based on an upper limit value and a lower limit value of the intensity of said electric signal that are set depending on the kind of said measurement target radiation;
   a counting part that counts discriminated electric signals of said measurement target radiation; and
   a radiation determining part that determines the presence or absence of the measurement target radiation by comparison between a count from said counting part and a predetermined threshold.

15. A scintillator plate manufacturing method of manufacturing the scintillator plate according to claim 13, the method comprising:
   a scintillator layer forming step of forming a scintillator layer by laying scintillator powders having a predetermined average particle diameter on a surface of an adhesive material and bonding the scintillator powders; and
   a scintillator layer polishing step of polishing one or both of surfaces of said scintillator layer until the scintillator layer has a predetermined thickness.

16. The scintillator plate manufacturing method according to claim 15, wherein
   in said scintillator layer forming step, a sub-step of removing scintillator powders that are not bonded to the surface of said adhesive material and laying the scintillator powders having the predetermined average particle diameter in gaps between the scintillator powders bonded to the surface of said adhesive material is repeated at least once.

17. The scintillator plate according to claim 13, wherein the average particle diameter of the other scintillator powders ($21y$) is more than half smaller than that of the scintillator powders ($21x$).

18. The scintillator plate according to claim 13, wherein one or both of surfaces of the scintillator layer is polished.

19. A scintillator plate excited by an incident radiation to emit scintillation light, comprising:
   a scintillator layer that is excited by $\alpha$-rays to emit scintillation light, and is selected from GPS scintillator, ZnS scintillator or YAP scintillator, the scintillator layer being formed by laying scintillator powders; and
   a substrate layer that is made with a material that is not excited by the $\alpha$-rays, and on which the scintillator layer is disposed, wherein
   an average particle diameter of the scintillator powders is equal to or greater than a range of the $\alpha$-rays in the scintillator layer, and
   the range of the $\alpha$-rays is defined as a maximum distance for which the $\alpha$-rays causing direct ionization can travel in the selected scintillator layer.

20. The scintillator plate according to claim 19, wherein the average particle diameter of the scintillator powders is equal to or less than 600 μm.

21. The scintillator plate according to claim 19, wherein one or both of surfaces of said scintillator layer is polished so that the thickness of said scintillator layer is equal to or greater than 20 μm and equal to or smaller than 100 μm.

* * * * *